Nov. 5, 1963  R. E. SMITH  3,109,602
METHOD AND APPARATUS FOR FORMING AND COLLECTING FILAMENTS
Filed April 4, 1960  12 Sheets-Sheet 1

INVENTOR.
ROY E. SMITH
BY Staelin & Overman
ATTORNEYS

Nov. 5, 1963  R. E. SMITH  3,109,602
METHOD AND APPARATUS FOR FORMING AND COLLECTING FILAMENTS
Filed April 4, 1960  12 Sheets-Sheet 2
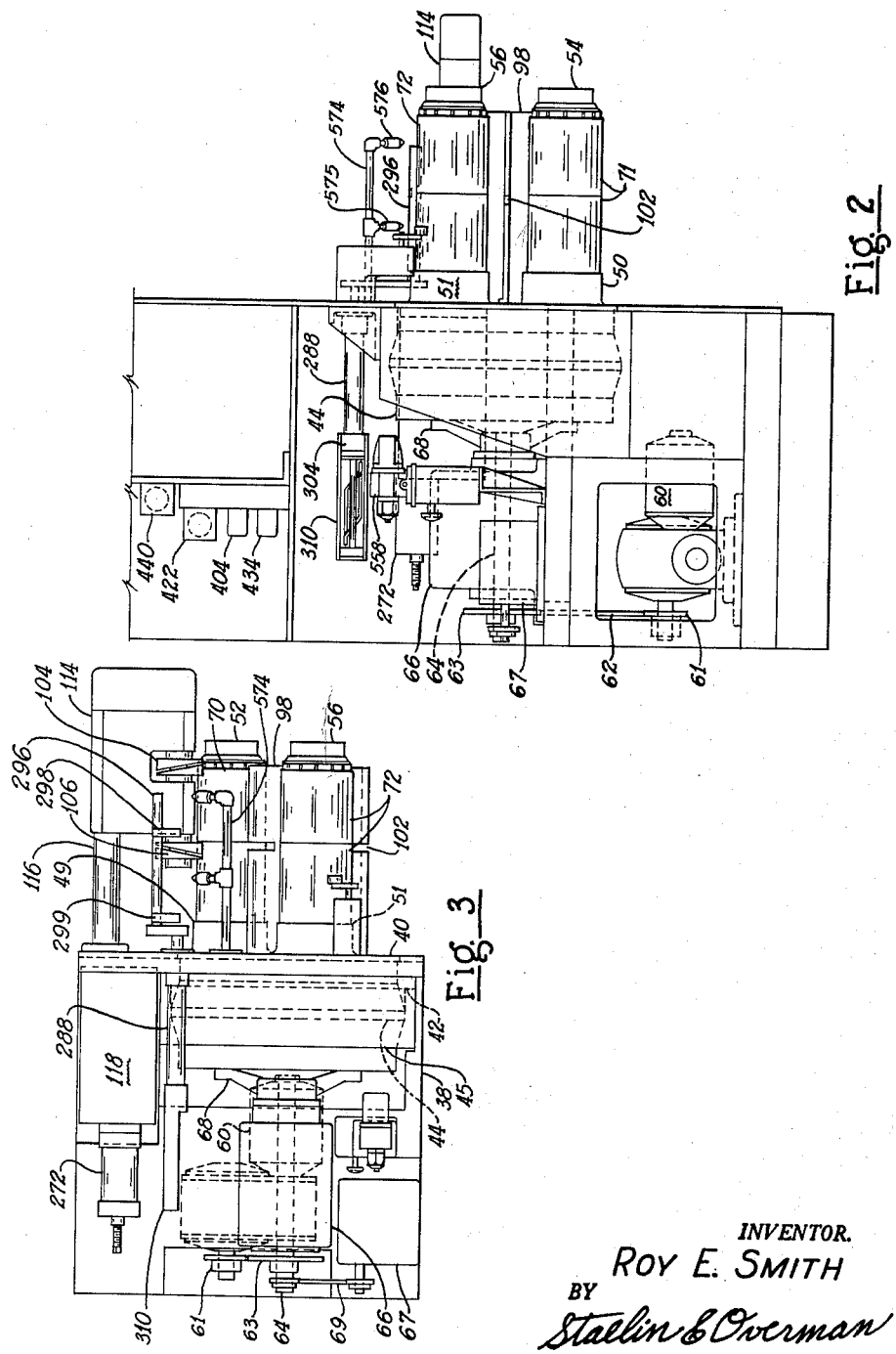
INVENTOR.
Roy E. Smith
BY
Staelin & Overman
ATTORNEYS INVENTOR.
Roy E. Smith
BY
Staelin & Overman
ATTORNEYS Nov. 5, 1963    R. E. SMITH    3,109,602
METHOD AND APPARATUS FOR FORMING AND COLLECTING FILAMENTS
Filed April 4, 1960    12 Sheets-Sheet 4
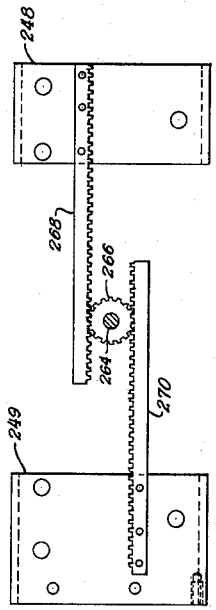
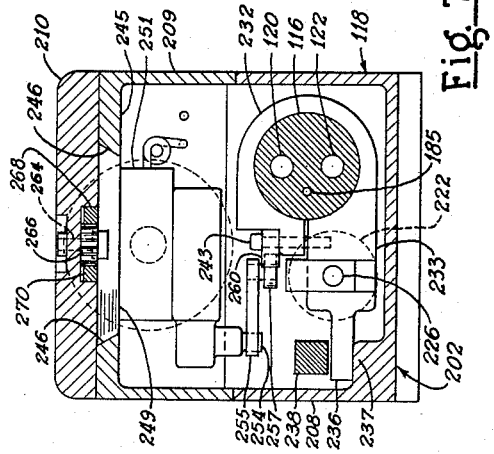
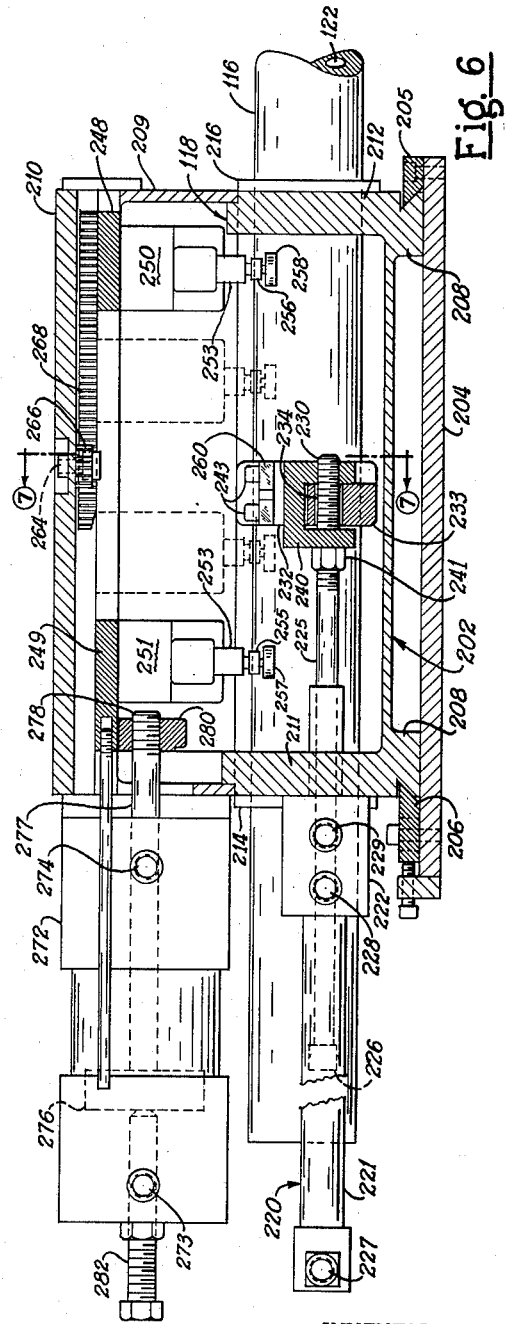
INVENTOR.
Roy E. Smith
BY Staelin & Overman
ATTORNEYS Nov. 5, 1963

R. E. SMITH 3,109,602

METHOD AND APPARATUS FOR FORMING AND COLLECTING FILAMENTS

Filed April 4, 1960

INVENTOR.
Roy E. Smith
BY
Staelin & Overman
ATTORNEYS

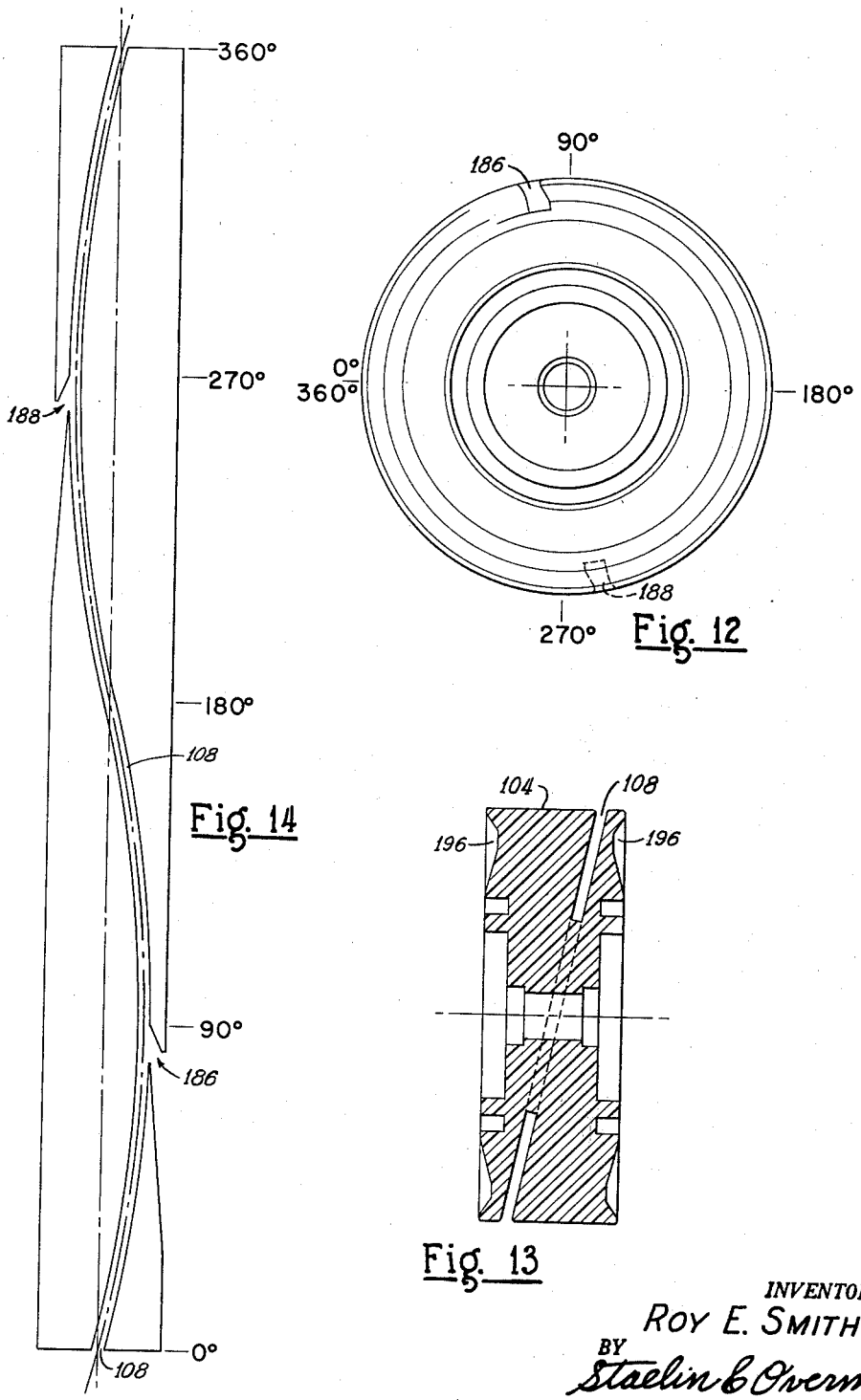

Nov. 5, 1963    R. E. SMITH    3,109,602
METHOD AND APPARATUS FOR FORMING AND COLLECTING FILAMENTS
Filed April 4, 1960    12 Sheets-Sheet 7
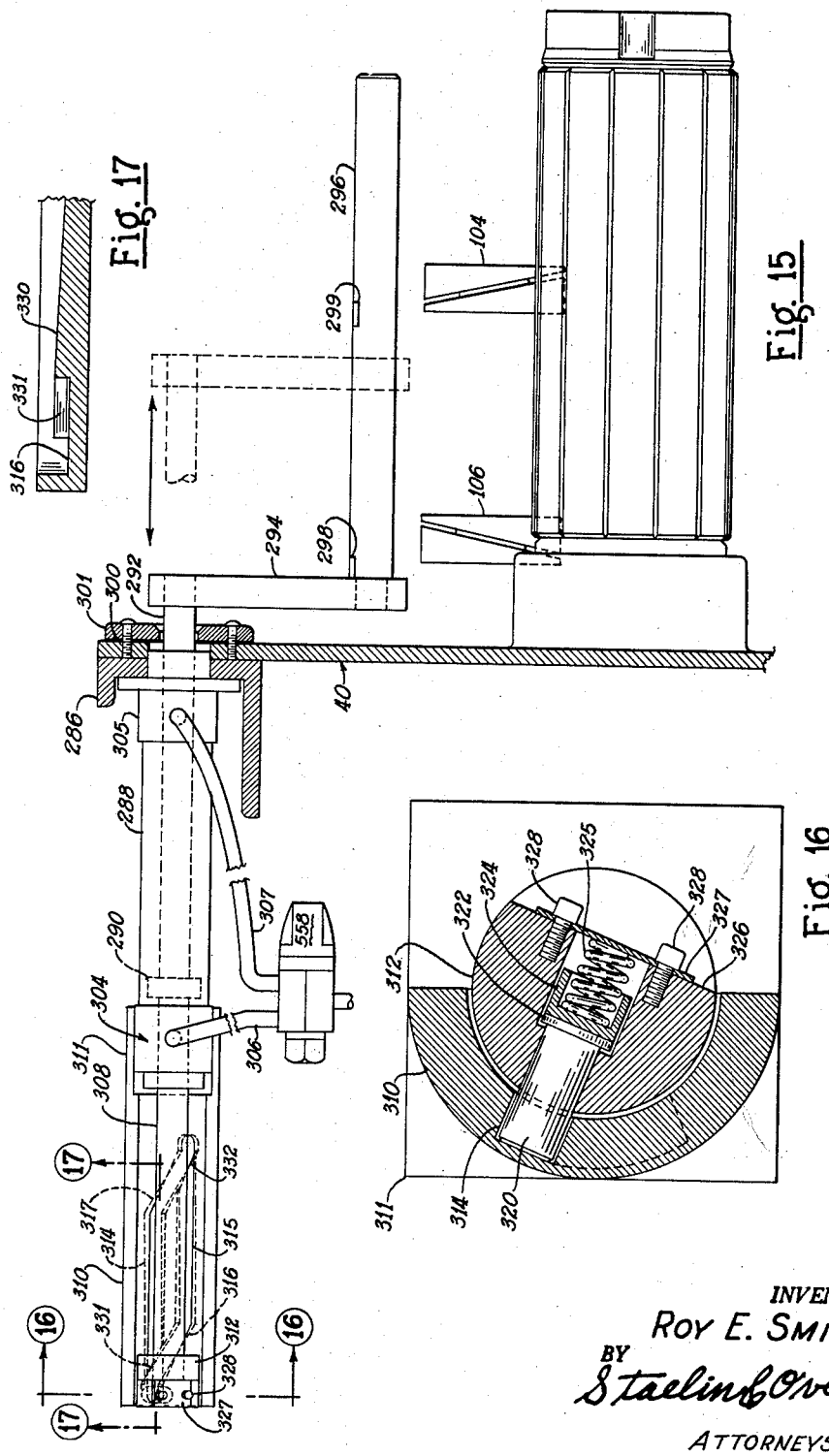
INVENTOR.
Roy E. Smith
BY
Staelin & Overman
ATTORNEYS INVENTOR.
Roy E. Smith
BY
Staelin & Overman
ATTORNEYS Nov. 5, 1963 R. E. SMITH 3,109,602
METHOD AND APPARATUS FOR FORMING AND COLLECTING FILAMENTS
Filed April 4, 1960 12 Sheets-Sheet 9

INVENTOR.
Roy E. Smith
BY
Staelin & Overman
ATTORNEYS

Nov. 5, 1963 R. E. SMITH 3,109,602
METHOD AND APPARATUS FOR FORMING AND COLLECTING FILAMENTS
Filed April 4, 1960 12 Sheets-Sheet 12

INVENTOR.
Roy E. Smith
BY Staelin & Overman
ATTORNEYS

United States Patent Office

3,109,602
Patented Nov. 5, 1963

3,109,602
METHOD AND APPARATUS FOR FORMING AND
COLLECTING FILAMENTS
Roy E. Smith, Manville, R.I., assignor to Owens-Corning
Fiberglas Corporation, a corporation of Delaware
Filed Apr. 4, 1960, Ser. No. 19,924
20 Claims. (Cl. 242—18)

This invention relates to method of and apparatus for forming continuous filaments from attenuable materials and more particularly to a method of and apparatus for automatically and continuously attenuating groups of filaments from heat-softened glass or other heat-softenable mineral materials or fiber-forming resins, and collecting strands of the filaments by winding the strands upon a collector rotating at high speed, and upon completion of the strand packages, doffing the same and automatically initiating winding of succeeding packages without interruption of the linear movement or attenuation of the filaments.

The present invention embraces a method of and apparatus for forming and packaging a strand or strands of continuous filaments of heat-softenable material, such as glass, wherein the attenuation of the filaments and their collection or packaging is continuously carried on without interruption whereby continuous filaments are attenuated of a proper size with a minimum of waste during transfer of the strand or strands from a completed package to an empty collector.

An object of the invention resides in a method of forming and collecting a strand of continuous filaments into a package wherein the linear movement of the strand is maintained during transfer or transition of the strand of filaments from a completed package onto an empty collector entailing only a slight variation of the linear rate of movement of the strand for a short period of time until the speed of the empty collector is restored to effect the formation of filaments of uniform size.

Another object of the invention is the provision of a method of simultaneously and continuously collecting or packaging two or more independent strands of continuous filaments wherein the filaments are attenuated by winding the strands on concurrently rotatable collecting means and the strands oscillated during collection by high speed, high frequency traverse means to form strand packages of substantial size and wherein the ends of the packages are tapered to resist or eliminate sloughing of wraps of the strands at the package ends.

Another object of the invention is the provision of a method of concurrently traversing two or more strands of continuous filaments by high frequency oscillations and distributing the strands lengthwise of the packages whereby substantially larger packages of strand may be formed and from which the strands may be smoothly withdrawn in further processing operations with a minimum of liability of breakage of the strands.

Another object of the invention resides in the provision of high speed oscillators or traverse means concomitantly operable for traversing two or more strands wherein the traverse means or oscillators are in dynamic balance to facilitate rotation of the oscillators at high speeds to obtain high frequency oscillation and traverse of the wraps or convolutions of strand in the packages.

Another object of the invention resides in the employment of electrically controlled hydraulically actuated, components for attaining high speed oscillation of the strand and comparatively low speed distribution of the strand lengthwise of a package to form a flat package having tapered ends whereby a substantially larger level wound package its produced facilitating smooth withdrawal of the strand from the package at high speeds and without strand breakage.

Another object of the invention resides in a method and arrangement for effecting transfer of two or more strands from filled packages onto empty sleeves or tubes for forming successive packages wherein differential speeds are established for the empty sleeves and the completed packages to effect a winding of the continuously advancing strands upon the sleeves and fracture of the strands adjacent the filled packages whereby continuity of attenuation of the filaments is maintained.

Another object of the invention resides in a method and apparatus for winding newly formed filaments in strand formation in a package in which the strand is distributed to form a flat package whereby the strand may be withdrawn at a high speed with a substantially constant angularity of the successive wraps whereby less tension and smooth take-off of the strand is assured and the tendency for breakage of the strand during take-off substantially eliminated.

Another object of the invention resides in the correlation or programming of the controlling media for the steps in the method whereby the winding and strand transfer operations are carried on automatically without interruption of the attenuation of the filaments of the strands, requiring the attention of the operator only to doff completed strand packages and strip the small amount of strand from the sleeves or collets at the strand transfer region.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is a side elevational view of the automatic winding apparatus illustrated in FIGURE 1;

FIGURE 3 is a top plan view of the automatic winding apparatus shown in FIGURE 1;

FIGURE 6 is a longitudinal sectional view of the mechanism for controlling the distribution of the strand lengthwise of the packages to form tapered ends of strand in the packages;

FIGURE 7 is a traverse sectional view taken substantially on the line 7—7 of FIGURE 6;

FIGURE 8 is a top plan view of a motion transmitting means illustrated in FIGURES 6 and 7;

FIGURE 12 is an end elevational view of one of the strand oscillator traverse means;

FIGURE 13 is a traverse sectional view through the oscillating means shown in FIGURE 12;

FIGURE 14 is a linear projected view of the periphery of the oscillator traverse of FIGURE 12 illustrating the contour of the strand receiving groove therein;

FIGURE 15 is an elevational view illustrating a strand hold-off and transfer means and actuating means therefor;

FIGURE 16 is an enlarged detail sectional view taken substantially on the line 16—16 of FIGURE 15;

FIGURE 17 is a detail sectional view taken substantially on the line 17—17 of FIGURE 15;

While the method and apparatus of the invention are especially adaptable for continuously attenuating streams of heat-softened material, such as glass, into fine continuous filaments and winding strands of filaments into packages, it is to be understood that the method of and apparatus for automatically and continuously collecting linear material into wound packages may be utilized for packaging other materials, such as monofilaments or multi-filament strands of synthetic fiber-forming resins or other filament-forming materials.

Figure 1:
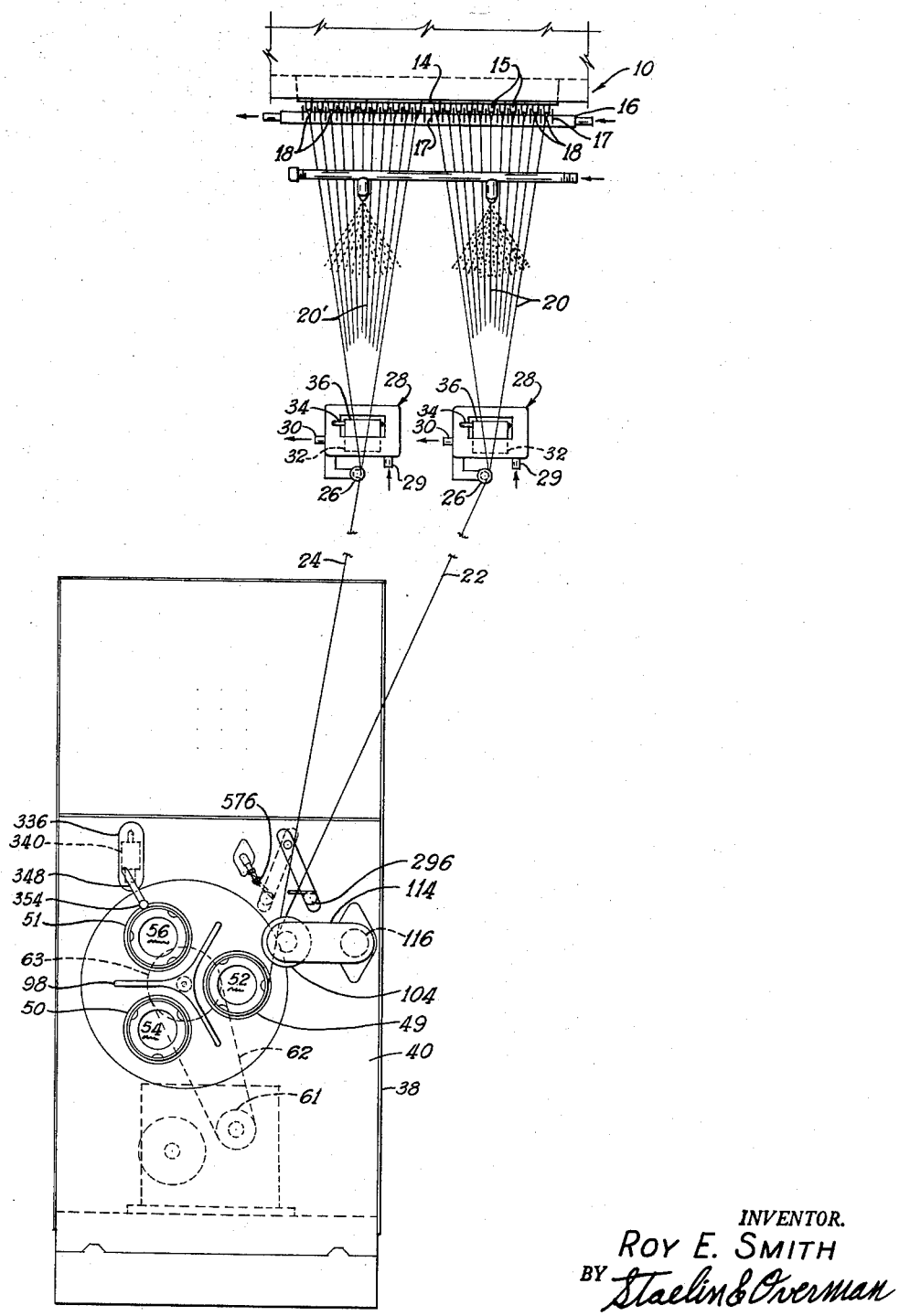
FIGURE 1 is an elevational view illustrating a form of automatic winding apparatus of the invention employed in carrying out the method of concomitantly attenuating two groups of streams of heat-softened material into filaments and winding two strands of the filaments into packages.

Referring to the drawings in detail and initially to FIGURES 1 and 3, there is illustrated a feeder 10 containing heat-softened, fiber-forming material such as molten glass. The feeder may be supplied with molten glass from a forehearth connected with a melting furnace (not shown) or otherwise provided with a supply. The floor 14 of the feeder is provided with a comparatively large number of tips or projections 15 and each of the projections formed with an orifice or outlet through which the glass or other fiber-forming material in the feeder is discharged in fine streams 18.

The winding apparatus of the invention is constructed and arranged to simultaneously attenuate two groups of streams into two groups of continuous filaments 20 and 20' which are formed into dual strands and the strands concomitantly wound upon rotating collector means to form packages of strand. The groups of streams are preferably delivered from a single feeder and each strand may contain upwards of four hundred or more filaments. The feeder 10 is preferably formed of an alloy of platinum and rhodium or other material capable of withstanding the intense heat required to maintain the glass or other material in the feeder in a flowable condition.

The feeder may be connected with a source of electrical energy of comparatively high amperage and low voltage for heating the glass or other material within the feeder and the electrical energy controlled to maintain the material in the feeder at a proper viscosity so that the streams 18 of glass flowing through the orifices in the tips 15 are substantially uniform.

A manifold 16, provided with fins 17 extending between rows of the streams, is arranged to accommodate a circulating cooling fluid, such as water for cooling the streams to raise the viscosity of the glass for improved attenuation.

In the illustrated embodiment of the invention, two groups of streams of glass or other material are drawn into continuous filaments and the filaments of each group are converged to form two strands 22 and 24, as shown in FIGURE 1. The groups of filaments 20 and 20' are converged as allustrated in FIGURE 1 by strand gathering members 26.

Means is provided for delivering a sizing lubricant or other coating material onto the newly formed filaments. As shown in FIGURE 1, receptacles 28 are provided to contain filament coating material. Each receptacle 28 is provided with an inlet 29 and an outlet 30 through which material may be circulated in the receptacles by means of a pump or other circulator (not shown) connected with a supply of coating material.

Journaled within the receptacle 28 is a roller 32 which is adapted to be partially immersed in the filament coating material in the receptacle. A second roller 34 is journally supported by the receptacle and an endless belt 36 of flexible material takes over the rollers 32 and 34. The roller 32 is preferably rotated at a comparatively low speed by a motor (not shown).

The filaments of each group are adapted to engage the belt at the region of the second roller 34, and coating material, adhering to the belt during its movement through the material in the receptacle, transferred to the groups of filaments by wiping contact of the filaments with the belt. It is desirable to prevent breakouts which may be caused by foreign particles adhering to the filaments to maintain a moist region ambient the filaments and fine sprays of water (not shown) may be delivered into the attenuating region to purge the atmosphere of foreign particles.

The two strands of filaments 22 and 24 are simultaneously wound onto rotatable collectors into two individual packages, thereby securing a high production yield. As shown in FIGURES 1 through 3, the automatic winding and package forming apparatus is inclusive of a housing 38 mounted upon the floor of a room and beneath the feeder 10, the housing enclosing the electrical, mechanical and hydraulic means for controlling and actuating components of the apparatus for carrying out or performing the steps in the method of attenuating filaments and automatically packaging the strands or linear material.

Supported interiorly of the housing 38 is a frame member 45 formed with an interior conically-shaped surface which forms a position of a journal bearing for a turret 44, the turret being held in place by a securing ring 42 formed with a frusto-conically shaped interior, providing the other portion of journal bearing for the turret.

The frusto-conically shaped portions of the frame member 42 and the securing ring 45 serve to prevent any endwise lost motion of the turret 44 which is arranged to be indexed or moved to three positions in carrying on winding operations.

Secured to the frontal region of the turret 44 is a circular plate 48 fashioned with three hollow boss portions 49, 50 and 51. Each of the hollow boss portions accommodates a winding collet and drive mechanism, the winding units being identical and one of the units being illustrated in detail in FIGURE 4.

Figure 21:
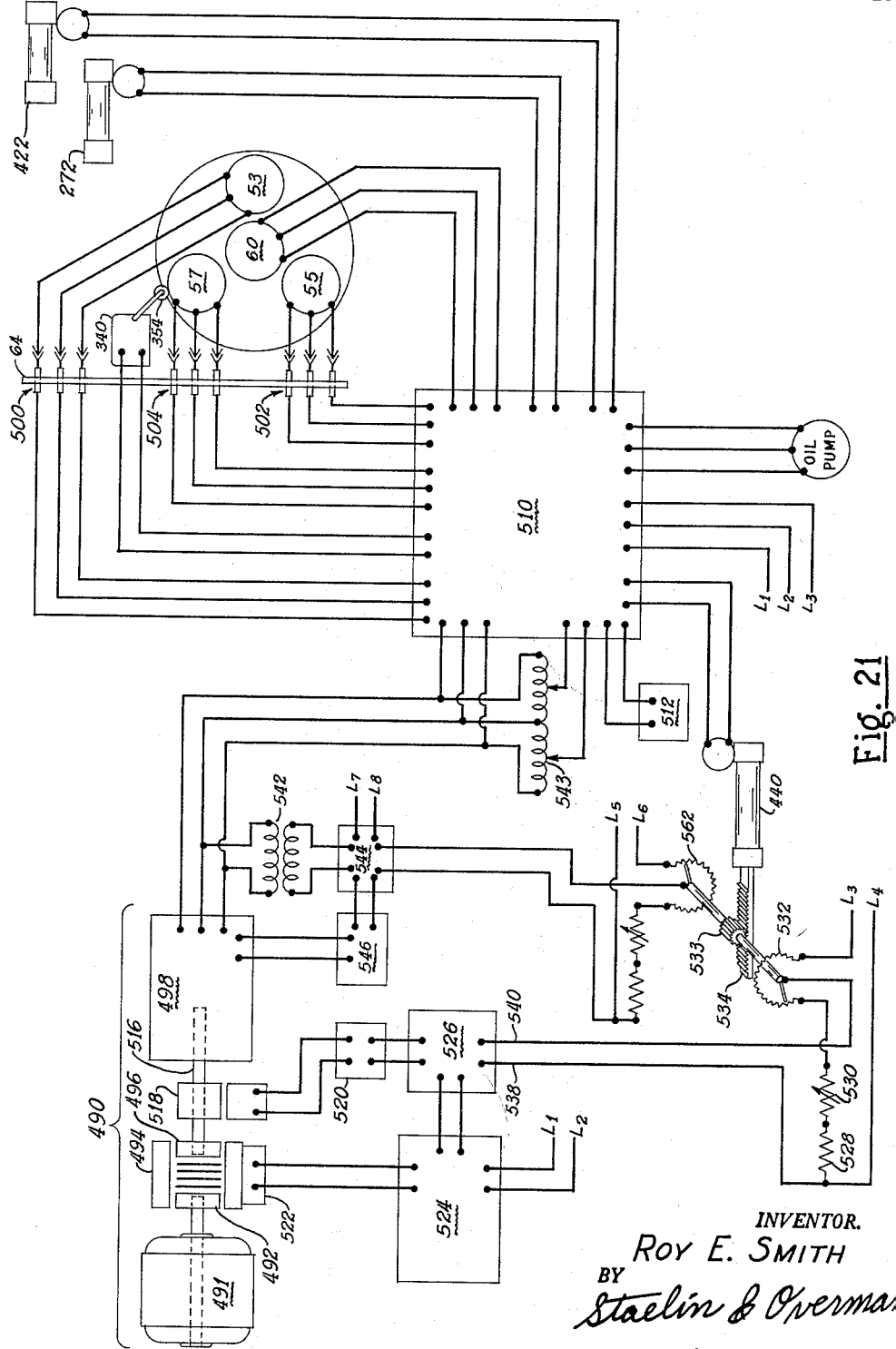
FIGURES 21, 22 and 23 are schematic diagrams of the circuits and electrically actuated and controlled components for initiating and carrying on the steps of the method in proper sequence in effecting continuous and automatic collection and packaging of strand material.

The units are respectively inclusive of driving collets 52, 54 and 56, provided with individually operable electrically energizable motors 53, 55 and 57 respectively, illustrated schematically in FIGURE 21. The three collets 52, 54 and 56 are spaced circumferentially equal distances apart and their individual axes of rotation are disclosed at equal radial distances from the axis of rotation of the indexible head or turret 44.

The turret 44 is adapted to be moved at each indexing cycle through one-third of a revolution by means of an indexing motor 60. The shaft of the motor 60 is provided with a sprocket 61 which is connected by means of a driving chain 62 with a sprocket 63 mounted upon a shaft 64 which is journaled in suitable bearings provided in a housing 66. Mounted upon the shaft 64 is a spider or bracket construction 68 which is secured to the turret or head 44 for rotating the head to indexed positions.

The purpose of indexing the collets is to successively move completed strand packages away from winding position and move empty or strand free sleeves or tubes into winding or strand collecting position. Each of the collets or mandrels 52, 54 and 56 is adapted to accommodate strand collection means and in the embodiment illustrated each collet is equipped with two collectors, the three groups of collectors being designated 70, 71 and 72 respectively.

Figure 4:
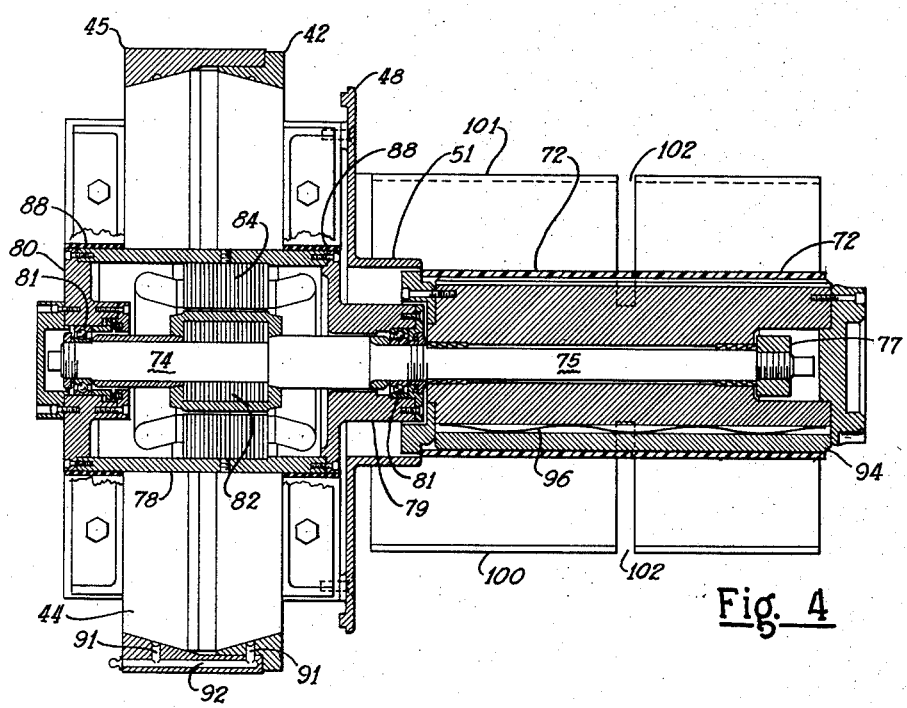
FIGURE 4 is a sectional view of one of the winding collets and driving means therefor.

As shown in FIGURE 4, each winding unit or collet assembly is inclusive of a motor, the motor 53 illustrated in FIGURE 4 driving the collet 56. The motor shaft 74 is provided with an extension 75, the extension being secured to the collet 56, the collet being secured on the shaft extension 75 by means of a nut 77. Each motor driving unit is inclusive of a cylindrically-shaped casing 78, a forward end plate 79 and a rear end plate 80.

The end plates are equipped with ball bearings 81 or other antifriction bearings for revolubly supporting the motor shaft 74. The shaft 74 is equipped with an armature 82, the cylindrical casing 78 supporting the motor field construction 84. Each of the drive motor and collet assemblies is supported by the indexible head or turret 44, each motor being surrounded by and cushioned in a pair of rings 88 formed of rubber or similar yieldable material whereby a yieldable mounting is provided for each of the winding units.

The bearing supports for the indexible head or turret 44 are lubricated through channels 91 and 92 shown in FIGURE 4, the channel 92 being provided with a lubricant fitting through which lubricant may be delivered to the bearing surfaces of the frame member 45 and the retaining ring 42 journally supporting the turret 44. Each of the motors for rotating the winding collets is of a type in which the speed may be varied by varying the frequency of the current supplied to the motors for the purpose of reducing the speed of rotation of a collet as the strand package increases in diameter during winding operations.

The peripheral region of each of the collets is formed with longitudinally extending recesses in which are disposed bars or friction shoes 94 which are biased radially outwardly of the collets by means of springs or flexible plates 96, one of the bars 94 and a spring 96 being illustrated in FIGURE 4. The resiliently biased bars 94 engage interior surfaces of the winding tubes or collectors and frictionally grip the tubes for rotation with the collets.

Figure 5:
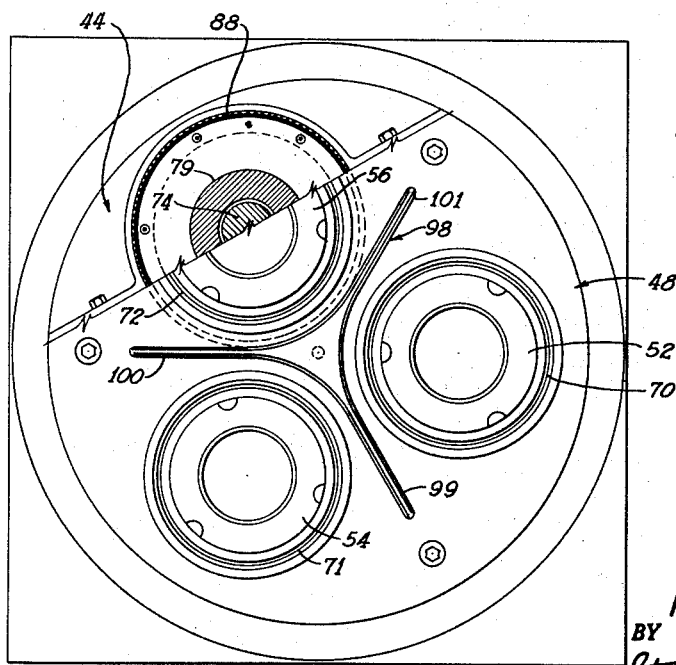
FIGURE 5 is a front elevational view of the turret means supporting multiple collets of the winding apparatus, certain parts being shown in section.

As particularly shown in FIGURES 4 and 5, baffle means 98 comprising radially extending plates 99, 100 and 101 is supported by the turret frontal plate 48, the members extending between adjacent collets to confine water sprayed onto strand oscillators in the region of the strand package being formed. The baffle plates are formed with slots 102 providing clearance for the strand 24 during strand transferring operations.

The present invention includes primary strand traverse means for distributing the strands lengthwise of the packages and secondary traverse means or high frequency oscillators for guiding the strands in angular directions as the strand is deposited or wound on the collectors in a manner to build a flat or level wound package. The traverse arrangement of the invention includes rotatable strand guiding oscillators or members which are reciprocated by an adjustable reducing stroke builder motion or primary traverse of low frequency and high amplitude which, combined with the low amplitude high frequency oscillation, imparts to the packages a generally uniform thickness with tapered ends to prevent sloughing of the strand at the ends of the packages.

In the traverse arrangement, the means for establishing the primary builder motion and the second high frequency oscillation of the strands are powered by hydraulic means. The high amplitude low frequency builder motion may be referred to as a "macro" traverse and the low amplitude high frequency oscillation as a "micro" traverse. In the embodiment illustrated, a rotatable strand guiding oscillator is provided for each of the dual strands, the oscillators 104 and 106 being particularly illustrated in FIGURES 3, 9 and 10.

The high frequency strand oscillators 104 and 106 are arranged to be driven at very high speeds and perfect balance of the oscillators is essential for successful high speed operation.

Each of the traverse oscillators has its peripheral region formed with an angular or cam slot, recess or groove 108 to impart oscillation to the strand, the base of the slot in each oscillator being defined by a cylindrical hub-like portion generated about an axis normal to the plane of the slot 108.

The strands 22 and 24 engage in the respective grooves or cam slots 108 of the traverse members 104 and 106 whereby each strand is guided by an individual traverse oscillator onto a sleeve or collector. Each of the grooves is preferably of the harmonic motion type or configuration as shown in expanded form in FIGURE 14 to effect, during rotation of the traverse members, a winding of the strands on each collector in overlapping wraps or convolutions in crossing, nonparallel relation.

By forming the wraps in crossing relation, the tendency of the wraps or convolutions of the strands to wedge or adhere together is reduced to a minimum, so that the liability of strand breakage, when the strand is unwound from the package in the subsequent processing operations, is greatly reduced. As particularly shown in FIGURES 9 through 11, a supporting means or traverse carrier 114 is provided for the traverse oscillators, the carrier 114 being reciprocable lengthwise of the strand collectors through a substantial distance at a comparatively slow rate of reciprocation to distribute the strand, controlled by the oscillators 104 and 106, lengthwise on the packages being formed.

The traverse oscillator carrier 114 is mounted upon a cylindrically shaped supporting shaft or member 116. As shown in FIGURE 6, the member 116 is supported by a supplemental frame 118 and is reciprocably or slidably mounted in suitable bearings carried by the supplemental frame 118. As hereinafter described, the cylindrically shaped member 116 is controlled to reciprocate through progressively reduced distances providing the builder motion for distributing the strand lengthwise of the collector sleeves and concomitantly form the tapered end regions of strand in the packages.

The cylindrically shaped member 116 is formed with interior lengthwise channels 120 and 122 for conveying liquid, such as oil or other fluid, to and from hydraulically operated motive means 166 for rotating the traverse oscillators 104 and 106. With particularly reference to FIGURES 9 and 10 it will be seen that the carrier 114 is provided with a recess 124 to accommodate the oscillator traverse 104, the recess 124 forming leg portions 126 and 128 shown in FIGURES 9 and 10.

The leg portion 126 is bored to accommodate a cylindrically shaped sleeve or tubular means 127 to accommodate a traverse oscillator supporting shaft 130. Disposed in the end regions of the sleeve 127 are ball bearings 132 journally supporting the shaft 130. The traverse oscillator 106 is mounted upon a tenon portion 134 formed on one end of the shaft 130 and the traverse 104 is mounted upon a tenon portion 136 formed at the other end of the shaft.

The shaft 130 is provided with a reduced portion 138 which is threaded to accommodate a frusto-conically shaped member 140. The shaft 130 is also provided with a second portion 142 of reduced diameter which is threaded to accommodate a frusto-conically shaped member 144. The members 140 and 144 engage the inner races of the ball bearings 132 to eliminate endwise motion of the shaft 130.

Secured on one end of the sleeve 128 is an annular member 146 formed with an annular recess 150 to accommodate an annular projection 152 formed in the side wall of the traverse oscillator 106. The projection 152 is of a size to provide running clearance between member 146 and the oscillator 106. The reduced portion 134 of shaft 130 is provided with an axial extension 154 to which is secured a cup-shaped member 156 held in place by securing means 157 connected with the extension 154. The cup-shaped member 156 extends into an annular recess formed in the oscillator 106 as shown in FIGURE 10.

The traverse oscillator 104 is formed with annular recesses defining annular projections 160 and 162, the projection 160 extending into an annular recess formed in the portion 128 of the traverse carrier 114, the projection 162 extending into an annular recess formed in an annular member 164 which is secured to the portion 128 of the traverse carrier.

Figure 10:
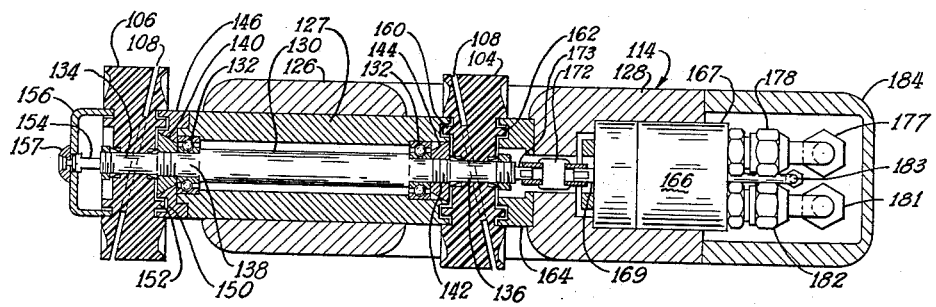
FIGURE 10 is a longitudinal sectional view through the oscillator traverse means, the view being taken substantially on the line 10—10 of FIGURE 9.
Figure 11:
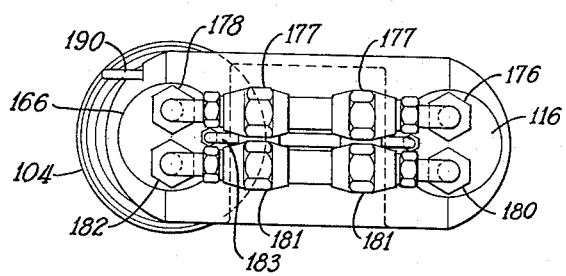
FIGURE 11 is an end view of the traverse carrier with an end closure removed.
Figure 19:
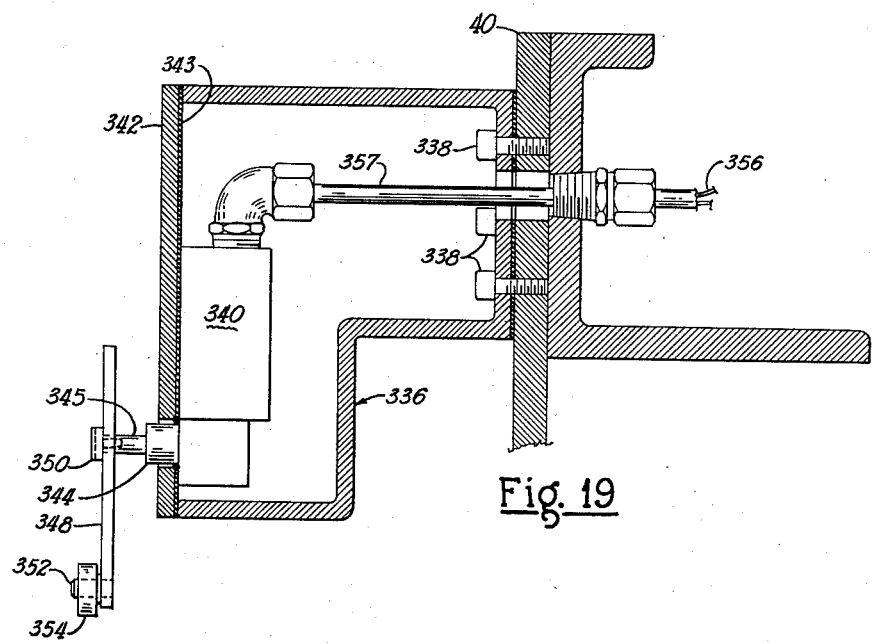
FIGURE 19 is a sectional view of the support and enclosure for the arrangement illustrated in FIGURE 17.

The portion 128 is provided with a bore in which is disposed the hydraulic actuated motor 166, the housing 167 of the motor being illustrated in FIGURES 10 and 11. The shaft 169 of the motor 166 is adapted to be rotated by fluid under pressure at very high speeds. A coupling 172 connects the motor shaft 169 with a tenon or projection 173 formed on the end of the shaft 130 whereby the strand oscillators 104 and 106 are simultaneously driven at the same speed.

The end of duct 120 in the bar 116 is connected by fittings 176, 178 and couplings 177 with the motor 166 to convey oil under high pressure to the motor 166. The oil return channel 122 at the end of the bar 116 is connected by fittings 180, 182 and couplings 181 with the motor 166 to convey spent fluid or oil away from the motor. The fittings and couplings are enclosed by a cover plate 184 shown in FIGURES 9 and 10. A drain tube 183 in communication with a third channel 185 in the bar 116 drains off any leakage past the seals in the motor 166.

The hydraulically actuated motor 166 is arranged to rotate the traverse oscillators 104 and 106 at speeds of upwards of forty-five thousand revolutions per minute or more and for this purpose oil or other fluid under pressure of twelve hundred pounds per square inch or more is employed on the high pressure side of the motor 166.

Figure 9:
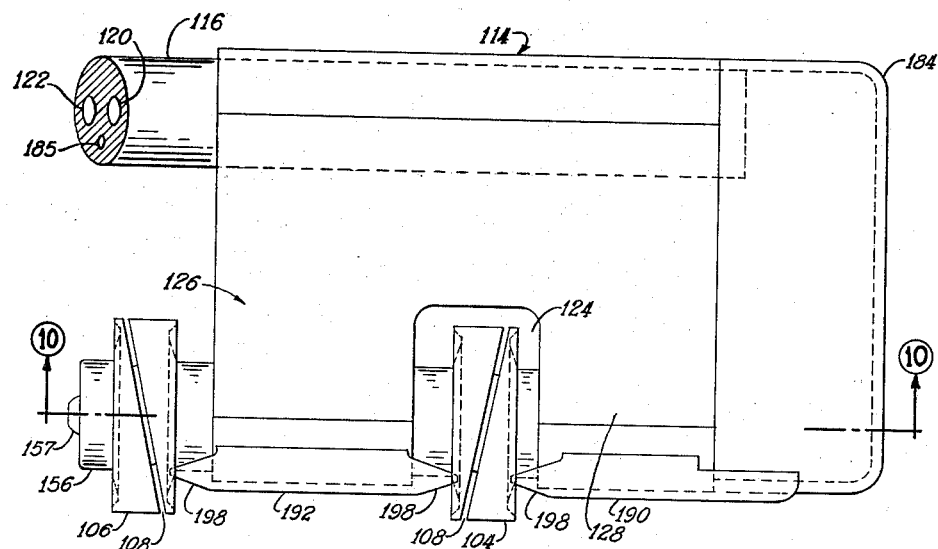
FIGURE 9 is a top plan view showing the dual traverse arrangement and carrier for the traverse means.

It will be noted from FIGURES 9 and 10 that the oscillators 104 and 106 are mounted upon the driving shaft 130 in a manner whereby the grooves are in opposed angular relationship to attain a perfect dynamic or running balance of the oscillators so that there is no vibration at high speeds. As shown in FIGURES 12 and 14, the regions of the grooves 108 in the oscillators adjacent the side walls of the oscillators are formed with reentrant slots 186 and 188 which are diametrically opposed to attain a dynamic balance.

The relative positions of the reentrant slots 186 and 188 in relation to the undulation or groove 108 in an oscillator is illustrated in FIGURE 14. The purpose of the reentrant slots is to admit the strands into the cam grooves 108 after a transfer of the strands has been effected onto the end region of the collecting tubes or on the adjacent regions of the winding collet so that the strands may be moved into the grooves automatically without interrupting the attenuation of the filaments of the strands.

The strand oscillators 104 and 106 are preferably formed of a laminated cloth reinforced phenolic resin such as a grade known as Westinghouse Micarta grade 286. This material has been found to provide long wear with minimum detrimental effect to the strands.

As shown in FIGURES 9 and 11, the oscillator traverse carrier 114 is provided with two elongated bars or members 190 and 192 which may be fashioned of the same material as the oscillators 104 and 106.

The purpose of the bars 190 and 192 is to engage the strands during the period that the strands are moved out of the grooves in the oscillators for transfer onto empty sleeves. It will be noted from FIGURES 9 and 13 that the side walls of the oscillators are fashioned with shallow annular recesses 196, and the ends of the bar 192 and one end of the bar 190 are fashioned with tapered portions 198, the apices of which extend into the recesses 196 in the oscillators to assure reentrance of the strands into the grooves 108 during strand transfer operations.

The traverse carrier 114 is reciprocated concomitantly with the high speed rotation of the oscillators 104 and 106 in order to distribute the strands lengthwise of the collector sleeves or tubes. FIGURES 6 through 8 illustrate an apparatus for reciprocating the bar 116 and the carrier 114. The arrangement shown is inclusive of means for progressively decreasing the lengths of the reciprocating strokes of the bar 116 and carrier 114 in order to build packages of strand having tapered ends.

The mechanism for accomplishing this purpose is carried by the housing 118 disposed in the position shown in FIGURE 3. As particularly shown in FIGURE 6, the housing 118 is supported upon a frame plate 204 secured to the frame 38 of the apparatus. The housing 118 is removably secured to the frame plate 204 by means of bars 205 and 206. The housing 202 includes a lower section 208, an intermediate section 209 and a top section or cover member 210 as shown in FIGURE 7.

The end walls 211 and 212 are bored to accommodate bushings or bearings 214 and 216 in which the member 116 is supported for slidable movement. The bar 116 is reciprocated by a hydraulic actuator 220 which is inclusive of a cylinder 221 having a portion 222 secured to the housing section 208. A piston 226 connected with the piston rod 225 is reciprocable in the cylinder 220.

The respective ends of the cylinder 221 are provided with fittings connected with two tubes 227 and 228 which are connected through valve means with the supply of oil or other fluid under pressure for reciprocating the piston and piston rod. The portion 222 of the cylinder is provided with a tube 229 forming a drain to dispose of any leakage of fluid that may occur past the seals in the cylinder. Surrounding the bar or rod 116 is a C-shaped clamping member 232, one leg 233 of the clamp member being formed with an opening 234 through which extends a threaded portion 227 formed on the piston rod 225.

The portion 233 of the clamp 232 has a projecting lug or extension 236 which is slidable between a boss portion 237 formed on the housing section 208 and a guide bar or abutment 238 arranged in parallelism with the upper surface of the boss 237. The boss 237 and the bar 238 form a guide means to maintain the bar 116 and the oscillator carrier 114 against rotation and for longitudinal movement in parallelism with the axes of the winding collets.

A U-shaped member 240 straddles the portion 233 of the clamp as shown in FIGURE 6 and is formed with a threaded opening to accommodate the threaded portion 227 of the piston rod 225, the member 240 being locked to the piston rod by a nut 241. Through this arrangement the movement of the piston rod 225 effects longitudinal movement of the bar or rod 116. The clamp 232 is drawn into securing engagement with the member 116 by clamping screws 243.

The clamp 232 may be adjusted to position the member 116 in order to properly position the traverse carrier 114 and the oscillators in proper relation to the collectors at the winding station. A flow control valve 406, shown schematically in FIGURE 20, is connected with the pressure fluid supply tubes 227 and 228 to meter the oil flowing out of the actuator 220 so as to control the rate of longitudinal movement of the piston rod 225 and the traverse supporting rod 116.

Figure 20:
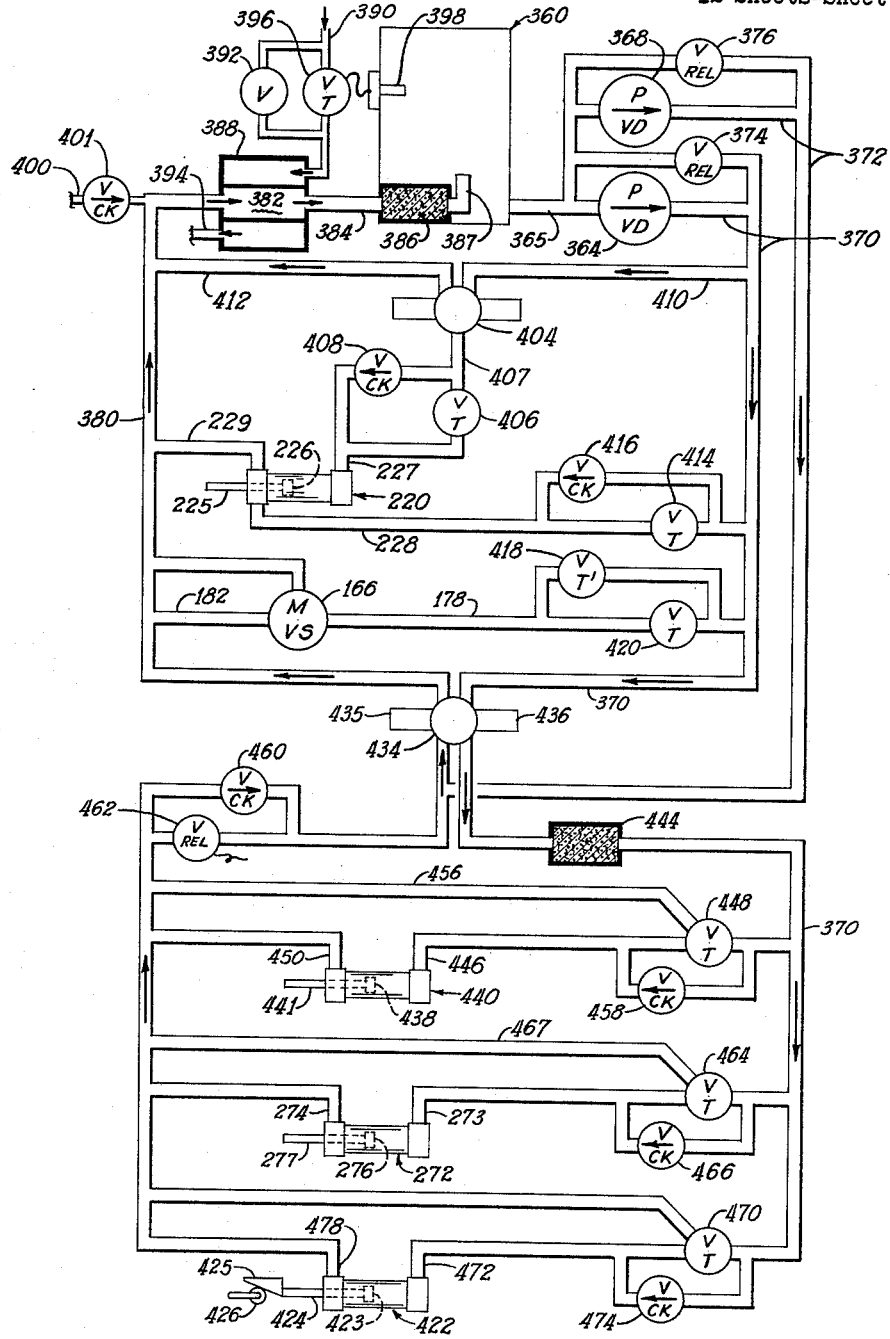
FIGURE 20 is a schematic view of hydraulic circuits for actuating various components of the automatic winding apparatus.

A solenoid operated direction control valve 404, shown in FIGURE 20, is arranged to be actuated and controlled by two limit switches which are alternately actuated by means carried by the clamp member 232. With particular reference to FIGURES 6 and 7 an upper wall 245 of the intermediate housing section 209 is formed with a lengthwise extending dovetail configuration 246 forming ways in which plates 248 and 249 are slidably mounted. Secured to and carried by the plate 248 is a housing of a limit switch 250 and secured to plate 249 is a second housing of a second limit switch 251.

Each of the limit switch housings is formed with a tubular extension 253 in which is journaled a stub shaft 254, the respective stub shafts being provided with arms 255 and 256. The arm 255 carries a roller 257 and the arm 256 carries a similar roller 258. As shown in FIGURE 7, the rollers are disposed in the longitudinal path of traverse of a cam or projection 260 mounted on the C-shaped clamp 232. The projection 260 is of generally V-shaped configuration and is arranged whereby reciprocation of the clamp 232 by the hydraulic actuator 220 alternately engage the rollers 257 and 258 to actuate the limit switches 251 and 250.

The limit switches are electrically connected with the solenoid operated fluid reversing valve means 404, shown in FIGURE 20, to effect successive changes in direction of the piston and piston rod 225. The area of the piston 226 of the actuator 220 at the free end is twice the area of the rod end as the cross-sectional area of the piston rod 225 within the cylinder is one-half the cross-sectional area of the cylinder bore. The solenoid control valve 404 is connected only with the fluid inlet tube 227 at the left end of the cylinder 221 as viewed in FIGURE 6.

When oil under pressure flows through the solenoid control valve 404 to the left end of the cylinder as viewed in FIGURE 6 against the free end of the piston 226, the force is twice that of the oil pressure on the rod end of the piston, and the oil at the right side of the piston is forced back into the supply by reason of the differential areas of the piston.

When the solenoid flow control valve 404 is actuated by limit switch 250 to cause the piston to move in a left-hand direction as viewed in FIGURE 6, the solenoid control valve is arranged to provide for free flow of oil out of the cylinder through the tube 227 and returned to the reservoir 360 shown in FIGURE 20.

The limit switches 250 and 251 mounted by the slidable plates 248 and 249 are adapted, during the winding of a package, to be moved toward each other in order to progressively shorten the lengthwise distribution of the strands on the collectors to form tapered ends in the packages. The cover portion 210 of the housing 118 supports a headed stub shaft 264 upon which is journaled a pinion or gear 266. The plates 248 and 249 are respectively provided with racks 268 and 270 meshing with diametrically opposed regions of the pinion or gear 266.

Through this arrangement, movement of one of the plates effects a corresponding movement of the other plate in the opposite direction. Mounted upon the lefthand end of the housing section 209, as viewed in FIGURE 6, is a hydraulic actuator 272, the cylinder of which is connected with fluid conveying tubes 273 and 274 opening into the opposite ends of the cylinder. Slidably mounted in the cylinder is a piston 276 mounted upon a piston rod 277.

The plate 249 carrying the limit switch 251 is provided with a depending member 280 having a threaded bore to receive the threaded end 278 of the piston rod 277 to establish operative connection between the plate 249 and piston rod 277.

When the piston 276 is moved in a right-hand direction as viewed in FIGURE 6, the plates 249 and 248 and the limit switches carried thereby will be moved toward each other, and the longitudinal distance traversed by the oscillator carrier support 116 is progressively shortened, thus reducing the longitudinal travel of the oscillators and the lengthwise area of distribution of the strands on the collector tubes.

The initial position of the piston 276 in the lefthand end of the cylinder 272 is determined by an abutment screw 282 which is threaded into the end of the cylinder. This adjustment determines the maximum lengthwise distribution of the strands on the collectors. An adjustable flow control valve 464 of conventional construction, shown in FIGURE 20, is preferably connected with the tube 273 to "meter" the oil entering the left end of the actuator cylinder, as viewed in FIGURE 6, at the rate desired to build a particular taper at the ends of the strand packages.

At the start of the formation of strand packages, the limit switches 250 and 251 are in the approximate positions illustrated in FIGURE 6. During winding of the strands upon the collectors, the fluid under pressure entering through the tube 273 into the cylinder of actuator 272 moves the piston 276 in a right-hand direction at a constant rate dependent upon the adjustment of the flow control valve 464.

The apparatus is inclusive of means for moving the dual strands out of engagement with the traverse oscillators to guide the strands onto a transfer region of the collector tubes or the tube supporting collet at the winding station upon completion of the winding of the dual packages. This arrangement is illustrated in FIGURES 15, 16 and 17. Secured to a frontal plate of the housing 40 is a bracket 286 supporting a fluid actuator comprising a cylinder 288 in which is slidably disposed a piston 290 secured to a piston rod 292.

The end region of the rod projecting forwardly of the plate 40 is provided with a transversely extending arm 294 to the end of which is secured a strand hold-off bar or member 296. Secured to the bar 296 is a pair of transversely extending fingers or elements 298 and 299 preferably formed of phenolic resin reinforced with fabric or fibrous material commercially known as Micarta. A seal 300 and an escutcheon plate 301 surround the shaft or rod 292 at its entrance through the plate 40 to prevent foreign matter, moisture and small particles of filaments entering the frame housing 38.

The cylinder 288 is provided with heads 304 and 305 to which are respectively connected tubes 306 and 307 for conveying fluid under pressure, such as compressed air, into and away from the cylinder for reciprocating the piston 290 in the cylinder. A portion 308 of the piston rod 292 extends in a left-hand direction as viewed in FIGURE 15 beyond the cylinder head 304.

Secured to the head 304 of the cylinder is an extension or member 310 which is of semicircular cross-section as illustrated in FIGURE 16, the portion 311 of member 310 attached to the head 304 being of generally rectangular shape.

Secured to the distal end of the portion 308 of the piston rod is a cylindrically shaped fitting or member 312. As shown in FIGURE 15, the interior of the semiannularly shaped member 310 is provided with a cam slot of closed type, being generally of a parallelogrammatic shape, the cam slot having lengthwise arranged parallel portions 314, 315 and angularly arranged parallel portions 316 and 317.

The member 312 is provided with a traverse bore accommodating a radially movable plunger or cam follower 320 which is adapted to extend into the cam groove configuration formed in the member 310. The plunger 320 is provided with a head 322 engaged by a cup-shaped member 324 in which is disposed an expansive coil spring 325. The member 312 is provided with a flat surface 326 supporting a plate 327 held in place by screws 328, the plate 327 being a backing means for the spring 325. The spring 325 constantly biases or urges the plunger 320 into the cam groove configuration formed in the member 310.

The portions of the cam grooves in member 310 are arranged so that during lengthwise movement of the piston 290, the arm 294 and the strand hold-off arm 296 is rotated through a partial revolution at the start of a longitudinal movement and is rotated in the opposite direction during the retractive longitudinal movement thereof.

These movements of the bar 296 are for the purposes of engaging and holding the strands away from the traverse oscillators when packages are completed and for effecting transfer of the advancing strands onto empty collectors or tubes. The base or bottom surfaces of the parallelogrammatically shaped cam groove in the member 310 are configurated to assure traverse of the cam follower or plunger 320 in a circuitous path in one direction as it traverses the groove configuration. As shown in FIGURE 17, the base surface of the lengthwise groove portion 314 is shaped with an angularly arranged ramp surface 330 which terminates in an abutment 331, the latter being elevated above the base surface of the groove portion 316.

The base surface of the portion 315 of the cam groove is shaped with an angular ramp in a direction opposite to the slant of the base surface 330 and terminates in an abutment 332 elevated above the base surface of the groove portion 317. Through the position of the abutments 331 and 332 in conjunction with the angularly arranged base surfaces of groove portions 314 and 315, the cam follower 320 is caused to traverse the groove configuration in one direction only.

When brought into operation, the strand hold-off member 296 is first moved in an angular path corresponding to the angularity of the groove portion 316, moving the strands out of the traverse oscillators 104 and 106. The member 296 is then moved in a direction parallel with the axes of the winding coilets, the fingers 298 and 299 engaging and moving the strands to the transfer regions of the tubes or of the collet.

During this operation, the cam follower or plunger 320 moves to the extreme end of the groove portion 315, the plunger moving off of the abutment 332 into the base surface of groove portion 317.

Under the influence of valve means 558, the piston 308 is moved in a left-hand direction as viewed in FIGURE 15, the abutment 332 guiding the plunger 320 along the groove portion 317 and into the groove portion 314 to the end region of the latter grooved portion. The angular position of the groove portion 317, during retractive movement of the piston rod, effects rotation of the piston rod and movement of the member 296 to a position whereby the strands may reengage the oscillators 104 and 106 through the reentrant slots 186 and 188 in the oscillators, the member 296 thereafter being moved longitudinally under the influence of the follower 320 in the groove portion 314 to the initial position illustrated in FIGURE 15. The admission of compressed air through the pipes 306 and 307 into cylinder head 304 is controlled by a solenoid actuated valve 558.

Figure 18:
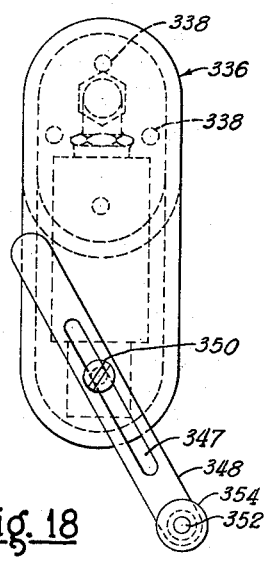
FIGURE 18 is an elevational view of a means for interrupting the operation of the winding apparatus when a pair of full sleeves or strand collectors are in position for indexing movement to the winding position or station.

The apparatus of the invention is provided with a safety device which interrupts all operations of the apparatus in the event that the operator has failed to remove completed strand packages from a collet and applied empty tubes or collectors to the collet which is in position to be indexed to the package winding station or position. This device is illustrated in FIGURES 1, 17 and 18. Secured by screws 338 to the frontal plate of the housing 40 is a casing or enclosure 336.

Mounted within the enclosure 336 is a limit switch 340, the casing 336 being provided with a closure plate 342 with a sealing gasket 343. The housing of the limit switch 340 is provided with a hollow boss portion 344 extending through an opening in the plate 342 journally supporting a shaft 345 of the limit switch. The end region of the shaft 345 extends into an elongated slot 347 formed in an arm 348 which is held to the shaft by a locking screw or member 350.

By releasing the screw 350, the arm may be adjusted with respect to the shaft 345 and held in adjusted position by drawing up the screw. The lower end of the arm 348 is provided with a stub shaft 352 on which is journaled a roller 354. The limit switch 340 is connected with a timer 355, shown in FIGURE 22, the electrical connections 356 being enclosed within a tube 357 and fittings shown in FIGURE 18.

The arm 347 is adjusted to a position whereby the roller 354 does not engage an empty collector tube on a collet. However should a full package of strand remain on a collet adjacent the switch 340 when the turret is indexed, the full package engages the roller 354 swinging the arm 348 and activating the switch. The activation of the limit switch 340 initiates the operation of a timer as hereinafter described, which disconnects the power circuit stopping the winding apparatus if the packages on the collet adjacent the limit switch 340 have not been doffed and empty sleeves placed upon the collet before the turret is indexed.

It is essential during a winding operation in order to maintain a constant linear speed of the strands to modulate the speed of the collet upon which the packages are being formed so as to progressively reduce the collet or spindle speed as the strand packages enlarge in diameter. It is also desirable that the speed of rotation of the oscillators 104 and 106 be maintained at a substantially fixed ratio with respect to the speed of the spindle or collet upon which packages are being formed in order to maintain a proper high frequency oscillating traverse of the strands to effect a substantially uniform angular positioning or crossing pattern of the wraps of strands as they are collected in the packages.

In the embodiment of the invention disclosed, hydraulic means are provided for progressively reducing the spindle speed and for progressively reducing the speed of rotation of the traverse oscillators, these means being schematically illustrated in the hydraulic circuit diagram illustrated in FIGURE 20. With particular reference to FIGURE 20, which schematically illustrates the hydraulic system, operating components and controls, there is shown a tank or reservoir 360 containing a supply of oil for operating the various components.

In the hydraulic system a pump construction is employed for simultaneously establishing different oil pressures or fluid pressures which are utilized for purposes hereinafter explained.

The high pressure pump section indicated at 364 receives oil from the tank 360 through a pipe 365 and the low pressure pump section indicated at 368 also receives oil from the tank 360 through the pipe 365. The high pressure outlet line of pump section 364 is designated 370 and the low pressure pump outlet line designated 372.

A relief valve 374 by-passes the high pressure pump section 364, and is adjustable to vary the pressure established by the pump in the high pressure line 370. A similar relief valve 376 by-passes the pump section 368 and is adjustable in order to vary the pressure established in the low pressure line 372. While the pressures of the pumps may be varied by modifying the adjustments of relief valves 374 and 376, a high pressure of approximately twelve hundred pounds per square inch and a low pressure of approximately five hundred pounds per square inch have been found satisfactory in operating the components of the winding apparatus.

An oil return line 380 is provided for all of the hydraulic components for returning oil to the tank 360. The oil return line passes through a heat exchanger 382 thence through a pipe 384 into an oil filter 386 and through an outlet 387 into the reservoir 360. The hydraulic circuit includes restricted orifices or metering orifices controlled by needle valves, and the filter 386 removes any foreign particles in the liquid or oil so as not to impede the proper metering of the oil.

The heat exchanger 382 is preferably of the water cooled type embodying a water jacket 383 supplied with water from a supply through pipe 390. A manually operable valve 392 is provided in the water supply pipe 390 to manually regulate the flow of water through the heat exchanger jacket 383 to an outlet pipe 394. A solenoid operated valve 396 is arranged in the water supply line 390 by passing the manually operated valve 392.

The solenoid of valve 396 is in circuit with a thermostat 398 disposed to be influenced by the temperature of the oil or liquid in the tank 360. If the temperature of the oil exceeds a predetermined value, the thermostat 398 activates the solenoid operated valve circuit to open the valve to increase or augment the flow of water through the heat exchanger 382. Oil may be introduced into the system through an inlet port 400 provided with a check valve 401.

The solenoid operated valve 404 is operable to admit oil at high pressure into the cylinder to act upon the free area of the piston 226 to secure movement thereof in one direction, and alternately to establish a connection with the return oil line 380 when the traverse carrier moves in the opposite direction. The pipe 227 opening into one end of the cylinder of actuator 220 is connected through a manually controlled needle valve 406 and a pipe 407 with the valve 404.

A check valve 408 by-passes the manually adjustable valve 406, the check valve providing flow of oil through pipe 407 past the check valve and through the tube 227 into the cylinder but preventing return flow of oil past the check valve. Through this arrangement the adjustable valve 406 on an operative stroke of the piston 226 in one direction meters or restricts the oil so as to control the speed of traverse in the said one direction. The valve 404 is arranged to alternately connect the pipe 407 by means of a pipe 410 with a high pressure line 370, or through a pipe 412 with the oil return line 380.

The opposite end of the cylinder or actuator 220 is connected by means of a pipe 228 with the high pressure oil line 370 through an adjustable needle valve or metering valve 414 for metering the flow of oil under high pressure through the tube or pipe 227 from the rod end of the cylinder for moving the traverse carrier 116 in the opposite direction. A check valve 416 is arranged in a by-pass around the metering valve 414 to prevent reverse flow of oil from the pipe 228 through the by-pass to the high pressure line 370.

This arrangement provides for flow of oil through the check valve 416 and through the tube 228 into the cylinder 220 but restricts flow of oil in the opposite direction so that oil flow in the opposite direction must be "metered out" through the metering needle valve 414.

It will be apparent that when the valve 404 is moved by solenoid mechanism to connect the pipe 410 with the pipe 407, the oil flow through pipe 227 into the one end of the cylinder is against the full area of piston takes place through the one way check valve 408 or through the metering needle valve 406 into the cylinder.

The pressure acting upon the full area of the piston in the cylinder 220 moves the piston rod 226 in a left-hand direction as shown in FIGURE 20, viz. in a right-hand direction as viewed in FIGURE 6. During this period of high pressure acting upon the large area of the piston 226 and, due to the differential area of the rod end of the piston, oil flows away from the cylinder through the tube 228 and the metering needle valve 414 so that the oil is "metered out" from the cylinder through the needle valve 414 into the high pressure oil line 370.

The valve 414 is manually adjustable to control the effective restriction and thereby control the rate of movement of the piston 226 and the traverse carrier 114. When the valve 404 is moved by its solenoid so as to establish communication between pipe 407 and the return pipe 412, oil under high pressure from the line 370 passes through the metering valve 414 and the check valve 416 through pipe 228 into the rod end of the actuator 220 thus moving the piston therein in a right-hand direction as viewed in FIGURE 20.

During this movement of the piston, the oil flows away from the cylinder through the pipe 227 and is "metered out" by the metering needle valve 406 into the return line to the reservoir 360. The check valve 408 prevents reverse flow of oil from pipe 227 into pipe 407 so that the oil flowing out through pipe 227 is restricted by the metering needle valve 406 thus establishing the rate of movement of the piston 226 and the traverse carrier 114 in the opposite direction. The solenoids of the valve 404 are actuated by the operation of the limit switches 250 and 251 shown in FIGURE 6, and their relative positions control the extent of movement of the traverse carrier 116.

The hydraulically actuated motor 166 rotating the oscillators 104 and 106 is arranged to be varied in speed during a winding operation in proportion to the rate of reduction in speed of a collector tube as the package of strand builds up to an enlarging diameter. In the embodiment illustrated, the speed of the motor 166 is controlled by dual valve means 418 and 420. The flow control valve 418 is manually adjustable to provide the required speed of rotation of the traverse oscillators at the start of a winding operation the other valve 420 being cam controlled or adjusted to modulate the oscillator speed at a substantially fixed ratio with respect to the speed of the collet and collectors upon which the strands are being wound.

The flow control valves 418 and 420 are connected with the high pressure oil line 370 and the inlet pipe 178 of the motor. The cam operated valve 420 is controlled by a hydraulic actuator 422 comprising a cylinder containing a piston 423 connected with a piston rod 424 equipped with a cam 425. The cam 425 cooperates with a follower 426 which is connected with an adjusting member of the valve 420 to regulate the latter upon movement of the cam 425 by the actuator 422.

A solenoid controlled valve 434 shown in FIGURE 20 is interconnected with both high and low pressure oil lines. The solenoids 435 and 436 of the valve mechanism 434 are connected with cycle timers of the programming arrangement hereinafter described. The solenoid controlled valve 434 controls the direction of movement of the piston 438 of a fluid actuator 440, the piston 276 of the actuator 272, and the piston 423 of the actuator 422.

The hydraulic actuator 440 is arranged to control the speed of the spindle or collet upon which a strand package is being formed. The piston rod 441 is connected by means of rack and pinion mechanism (not shown) for operating potentiometers 532 and 562 forming components of the electrical control circuits for modifying reference voltages to modulate the speed of the electrically energized motor of each of the spindles or collets for reducing the speed of a winding collet as the strand package increases in size in order to maintain substantially constant the travel of the strands of filaments as they are being collected.

The fluid actuators 440, 272 and 422 are associated with valve mechanisms for restricting or metering the high pressure oil flow to the cylinders of the actuators whereby the pressure is effective against the large area regions of the actuator pistons. Arranged in the high pressure oil line 370 and in advance of the valve means controlling the actuators 440, 272 and 422 is a filter 444 to assure that the oil is free of foreign particles so as not to impair or block the operation of the metering valves for restricting oil flow to the hydraulic actuators.

During the building of strand packages upon rotating collectors the solenoid controlled valve 434 is positioned whereby the oil in the low pressure line 372 flows through the valve 434 directly to the return line 380 thence into the reservoir 360. Arranged between the pipe 446 leading into the end of the actuator cylinder of the actuator 440 and the high pressure oil line 370 is a manually adjustable flow control valve 448 for metering high pressure oil into the cylinder, and a check valve 458 to allow free flow of oil in the opposite direction. A drain line 456 is connected between valve 448 and the return line 380.

Pipes 450, 274 and 478 connect the rod ends of the cylinders of actuators 440, 472 and 422 respectively with the oil return line 380. A check valve 460 is arranged in a portion of the return line 380 as shown in FIGURE 20 to prevent back pressure building up in the return line, and to facilitate rapid flow of oil into the rod ends of the cylinders of actuators 440, 272 and 422 to accelerate resetting of the actuators.

A pressure relief valve 462 by-passes the check valve 460 to maintain a back pressure in the portion of the return line 380 connected with the rod ends of the actuators 440, 272 and 422 as oil is metered into pipes 446, 273 and 472.

Metering valve means is provided for regulating the flow of high pressure oil from line 370 into the large end of the hydraulic actuator 272 to control of the rate of movement of the piston 276 and thereby control the taper build-up of the strand packages by varying the positions of the limit switches 250 and 251 shown in FIGURE 6. The regulating means including a manually adjustable metering valve 464 is disposed between the high pressure oil line 370 and the pipe or tube 273.

A check valve 466 is arranged in parallel with the manually adjustable valve 464 to permit free flow of oil out of the free piston end of the actuator 272 during resetting operations. A drain line 467 is connected between the valve 464 and the oil return line 380.

The metering valve 464 is adjustable to regulate flow of oil under high pressure into the large end of the actuator 272 at a rate to slowly but constantly move the limit switches 250 and 251, through the rack and pinion mechanism shown in FIGURE 8, toward each other to progressively shorten or reduce the lengthwise distribution of the strands on the collectors. If a steep taper is desired at the package ends the valve 464 is adjusted to a low rate of flow of oil into the large end of the actuator, if a more gradual and longer taper is desired at the package ends the valve 464 is adjusted to increase the flow of oil into the actuator.

A manually adjustable metering valve 470 is disposed between the high pressure oil line 370 and the pipe 472 at the large end of the actuator cylinder 422. The metering valve 470 regulates the flow of oil under high pressure into the cylinder 422 acting against the piston 423 to move the piston rod 424 and cam 425 to vary the position of the cam follower 426 and valve 420 for varying the speed of rotation of the oscillator traverse motor 166. A check valve 474 is in parallelism with the adjustable metering valve 470 to provide for free flow of oil away from the cylinder during resetting operations.

Figure 22:
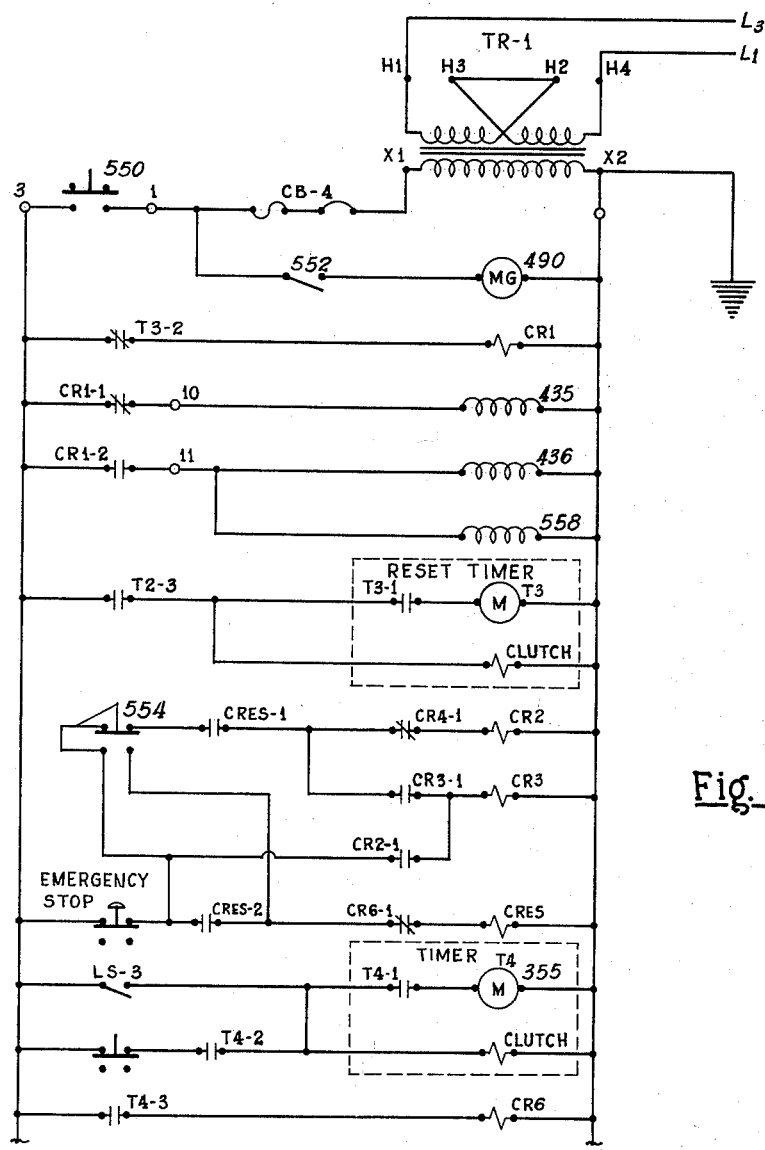
Figure 23:
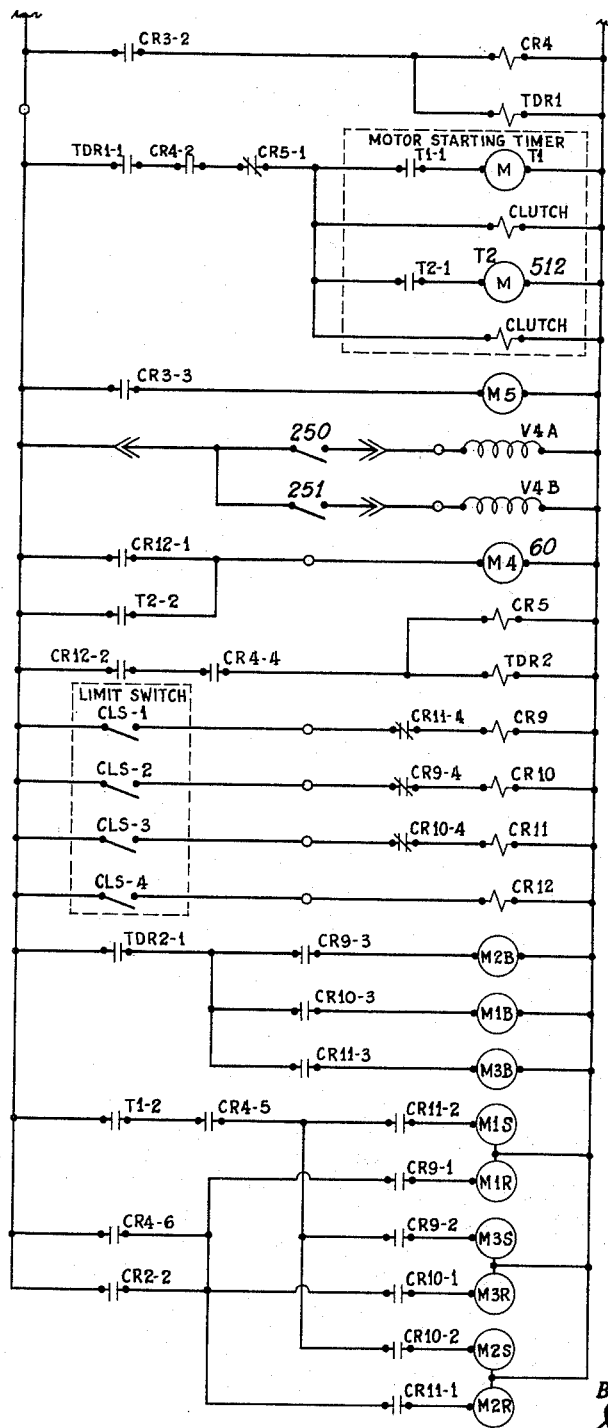

FIGURES 21, 22 and 23 illustrate schematically the electric control and activating circuits for various operating components of the winding apparatus for effecting the operations of the method and their proper sequence providing for automatic operation in winding successive pairs of strand packages without interruption of filament attenuation, maintaining substantially constant the linear travel of the strands during package forming operations.

The speed of the collet operating motors 53, 55 and 57 when in winding position, viz. the position of motor 53 indicated in FIGURES 1 and 21 which drives the collet 52 during winding operation at the position indicated at FIGURE 5, is controlled to compensate for the enlarging diameter of the packages during winding operations. With particular reference to FIGURE 21, a constant speed, electrically energized motor 491 provides a drive for a rotor 492 of an eddy current clutch 494.

The eddy current clutch 494 includes a driven rotor 496, the torque being transferred from the rotor 492 to the rotor 496 by magnetic flux. The driven rotor 496 directly drives the armature of a high frequency alternator or generator 498 of a character whereby the frequency of the current generated by the alternator 498 varies with its speed of rotation. The three phase variable frequency current from the alternator 498 is utilized for driving the collet rotating motors 53, 55 and 57 which respectively rotate the collets 52, 54 and 56 shown in FIGURES 1, 2, 3 and 5.

The circuits for the collet driving motors are controlled by control relays and switch means hereinafter described and shown schematically in FIGURES 22 and 23. The relay actuating circuits for the motor control contact rings 500, 502 and 504 are included as components of a master controller or programmer 510 shown in FIGURE 21. The control arrangement includes a package timer 512 which is adjustable and determines the duration of winding of the strand packages at the winding station.

While the time factor is employed to cycle the package timer 512 in the embodiment illustrated, it is to be understood that the package timer may be a counter which electrically or mechanically summates the number of revolutions of the package sleeve for a completed package. The control functioning of the timer 512 will be hereinafter described in connection with the operation of the winding apparatus.

The shaft 516 driving the alternator 498 also drives a tachometer generator 518 which impresses voltage through a rectifier 520 to a voltage summating means or differential amplifier 526. An energizing coil 522 for the eddy current clutch 494 is supplied with direct current through a Thyratron electronic control means 524, the control 524 being supplied with alternating current derived from supply lines L1 and L2. The Thyratron control 524 is connected with the voltage summating means or differential amplifier 526.

The control circuit for the tachometer generator 518 includes a current supply from supply lines L3 and L4. This circuit includes fixed and adjustable resistances 528 and 530 respectively and a potentiometer 532 for varying the voltage range supplied to the differential amplifier 526. The movable arm of the potentiometer 532 is driven by a pinion 533 enmeshed with a rack 534 associated with and actuated by a piston rod 441 of the hydraulic actuator 440 shown in FIGURE 20.

Through the medium of the potentiometer 532 which is operated by actuator 440, a variable voltage is supplied through leads 538 and 540 to the differential amplifier 526. The differential amplifier 526 summates the voltage from the Thyratron control 524 with the reference voltage supplied through the potentiometer 532 constituting the input for the control 524. The control 524 regulates the strength of the current supplied to the coil 522 to vary the degree of slip of the eddy current clutch 496 and thereby vary the speed of the alternator 498.

The voltage of the tachometer generator circuit normally maintains constant the current in the current coil 522 through the Thyratron control 524 to maintain the alternator 498 at a substantially constant speed. Hence, a change in the voltage supplied to the Thyratron control 524 from the potentiometer 532 through the differential amplifier 526 modifies the current supplied to the coil 522 of the coupling 496. To obtain a proper summated voltage to the Thyratron control, the circuit of the tachometer generator is of a negative potential and the circuit of the potentiometer 532 is of a positive potential.

A small transformer 542 is connected across one phase of the three phase generator output and is arranged to provide a secondary or sample voltage which is proportional to the generator output voltage. This voltage of the small transformer is rectified and filtered by a second voltage summating means or differential amplifier 544 in the same manner as the voltage set up in the tachometer generator 518.

The rectified sample voltage is compared with the reference voltage of the proper magnitude supplied by a second potentiometer 562 driven by the pinion 533 to the differential amplifier 544, and the differential between the sample voltage provided by the transformer 542 and the reference voltage provided through the potentiometer 562 is utilized to control the direct current output of an electronic exciter 546 for the high frequency alternator 498, the direct current output controlling the output voltage of the high frequency alternator 498.

The movable components or arms of the potentiometers 532 and 562 are reset or correlated at the start of winding of the dual packages and the flow of oil under pressure into the actuator 440 metered to drive the potentiometers to thereby vary the current supplied to the direct current coil 522 of the eddy current clutch 496 and the output voltage of the alternator 498. By varying the current supplied to the current coil 522, the magnetic flux in the slip clutch 496 is varied during package forming operation and thereby effects a corresponding variation in the speed of the alternator or generator 498 even though the motor 490 rotates the rotor component 492 of the slip clutch by a substantially constant speed.

The drive speed control provided by the eddy current clutch and its controls is correlated with the voltage output of the alternator 498 provided by the electronic exciter 546 so that the speed of the collet driving motor at the winding station may be progressively reduced as the strand packages increase in size.

FIGURES 22 and 23 illustrate the circuits of the various electrical controls of the programming arrangement for initiating and activating components of the automatic winding apparatus in their proper sequence of operation. FIGURE 23 is a continuation of the circuit arrangement of FIGURE 22 and reference to the various control components in the circuits will be made in connection with the description of the operation of the apparatus.

The following description of the operation of the apparatus is premised upon an initial starting of the automatic winding apparatus, the operations being automatic after an initial start up.

In initiating the operation of the apparatus, the operator first closes the control power switch 550 illustrated in FIGURE 22. The operator places two collector or packaging tubes or sleeves on each of the motor driven collets 52, 54 and 56, the collet 52 being illustrated at the winding station in winding position. The operator then closes the motor-generator starting switch 552 which energizes the motor control unit for the motor 491 of the motor-generator or alternator 490 illustrated schematically in FIGURE 21.

In initial condition, the control relay CR1 is energized through the normally closed contacts of the timer T3–2. The solenoid 435 of the hydraulic control valve 434 is de-energized through the normally closed contacts of the control relay CR1–1. The solenoid 436 of the valve means 434 is energized through the contacts of control relay CR1–2, this setting of the control valve directing oil under pressure into the rod ends of the hydraulic actuators 440, 272 and 422 to reset the actuators by moving the pistons in right-hand directions as viewed in FIGURE 20 toward the large ends of the cylinders, the oil in the right-hand ends of the cylinders being returned to the reservoir 360 through the return line 380 provided by the connection established through the valve means 434.

The solenoid actuated valve 558 illustrated in FIGURE 15 in the compressed air supply line to the actuator 288 is in a position wherein the strand hold-off bar 296 is moved by compressed air into its projected position to hold the strand at the end of the collet or package sleeves at the winding station. The four cam operated limit switches CLS–1, CLS–2, CLS–3 and CLS–4 are contained in a housing 67, shown in FIGURE 3, and are driven by a chain and sprocket means 69 from the turret operating shaft 64. The control relay CR9 is energized through the cam limit switch CLS–1 and the normally closed contact of control relay CR11–4.

The operator depresses the foot-operated switch 554 shown in FIGURE 22 and the following conditions are established: Control relay CRES is energized through normally closed contacts CR6–1, and is sealed in or held in this position through the contacts of the control relay CRES–2. The contacts of the control relay CRES–1 close but while the operator maintains the foot switch depressed, control relay CR2 is not energized.

The operator releases pressure on the foot switch 554. With the foot switch in release position, the relay CR2 is energized through the contacts of control relay CRES–1 and the normally closed contact of control relay CR4–1. The running starter M1R, shown in FIGURE 23, for the drive motor 53 for the collet 52 at the winding position is energized through the relay contacts CR2–2 and CR9–1.

The collet 52 will start to rotate and the operator wraps the dual strands around the end region of the collet 52, both strands engaging against the front finger or projection 299 on the strand hold-off bar 296 shown in FIGURE 15.

After a small amount of the strands is wound on the collet 52, the operator then lifts the rear strand over the finger 299 so that the strand 24 rests against the rear finger or projection 298 and the strand 22 against the projection 299 on the hold-off bar 296. During the period of time that the collet driving motor 53 is increasing in speed, the following conditions exist in the circuits.

The control relay CR3 is energized through contacts CR2–1 and is held in or seals in through the relay contacts CR3–1. The hydraulic pump motor control M5 shown in FIGURE 23 is energized through contacts CR3–3. The forward motion of the traverse carrier 114 and its supporting bar 116 is controlled by the limit switch 250 and the rearward movement thereof controlled by the limit switch 251. The control relay CR4 and the time delay relay TDR1 are energized through relay contacts CR3–2.

The start up timer TDR1 is on delay. The contacts of relay CR4–1 open, de-energizing control relay CR2 which causes a momentary operation of this control relay. The motor starting timer T1 and the package timer T2 are energized through contacts of the time delay relay TDR1–1, relay contacts CR4–2 and the normally closed contacts CR5–1. The relay contacts CR4–6 take over the duty of the relay contacts CR2–2 since the control relay CR2 was de-energized when control relay CR4 became energized.

The contacts CR4–5 are closed but the motor control M3S for the motor 57 adapted to drive the stand-by spindle 56, which is subsequently to be moved into winding position, is not rotated since the timer T1–2 is time closed. The contacts CR4–4 are closed, but since the contacts of CR12–2 are open, the control relay CR5 is not energized. The limit timer T3 for holding the strand from the oscillators is energized through the timer contacts T2–3.

After a predetermined period, timer contacts T3–2 open, de-energizing the control relay CR1. The relay contacts CR1–2 open de-energizing the solenoid 436 of the valve means 434 and the solenoid controlled valve 558 for the compressed air line of the actuator 288 shown in FIGURE 15, retracting the strand hold-off bar 296 in a left-hand direction as viewed in FIGURE 15.

When the strand hold-off bar moves in a left-hand direction, the cam grooves 317 and 314 (FIGURE 15) rotate the hold-off bar 296 out of the path of movement of the dual strands into the position shown in FIGURE 15. When the strand hold-off bar 296 moves out of engagement with the strands, the strands move through the reentrant slots 186 and 188 in the high frequency traverse oscillators 104 and 106 and the winding of dual packages upon the sleeves at the winding station is initiated as the motor 53 is rotating the spindle 52 at the winding station.

The relay contacts CR1–1 return to normally closed position, energizing the solenoid 435 of the valve means 434 to reset and bring into operation the fluid actuator 440 for controlling the collet speed and the traverse carrier control actuator 272 for building the tapered ends in the strand packages, and the actuator 422 for controlling the speed of rotation of the oscillators 104 and 106.

The potentiometers 532 and 562 are set into operation by the rack and pinion mechanism actuated by the fluid actuator 440 providing the varying voltages for influencing the speed of the alternator 498 and its output voltage and frequency for progressively reducing the speed of the motor driving a winding collet at the winding station as the strand packages increase in size. The winding of the strands at the winding station continues until the desired package size is attained.

During the winding of the packages, the oil under high pressure, admitted to the end of the actuator 272 through the tube 273 controlled or metered by the metering valve 464, moves the piston 276 slowly in a right-hand direction as viewed in FIGURE 6 which through the rack and pinion arrangement shown in FIGURES 6, 7 and 8 continuously shifts the positions of the limit switches 250 and 251 to gradually shorten the lengthwise distribution of the strands on the packages to build the tapered ends. The movement of the limit switches 250 and 251 toward each other shortens the successive strokes of the piston rod 225 of the actuator 220 and correspondingly reduce successive strokes of the traverse carrier 114 and its supporting rod 116.

The speed of rotation of the strand traverse oscillators 104 and 106 is modulated as the packages increase in size. As the piston 423 in the fluid actuator 422 is moved by oil under pressure metered through the valve 470, shown in FIGURE 20, the cam 425 carried by the piston rod 424 of actuator 422 moves the cam follower 426 which mechanically varies the metering or degree of restriction of the hydraulic control valve 420 to gradually reduce the speed of rotation of the oscillators by reducing the speed of the oscillator driving motor 166 by reducing the rate of flow of oil under pressure to the motor.

When the desired size of package has been wound, the following actions occur in effecting transfer of the strands automatically to empty sleeves or collectors moved into position at the winding station. Just prior to the packages attaining their full size, the timer contacts T1–2 close which energizes the motor 57 to initiate rotation of the collets 56 carrying the empty sleeves or collectors 51 to rotate the sleeves at the same speed as the sleeves bearing completed packages preparatory to the indexing of the turret 44.

The reduced voltage transformer 543, shown in FIGURE 21, is brought into the circuit of motor 57 which is in sequence for indexing into the winding position. The motor 57 during starting operates on reduced voltage through the transformer 543 for a preset period of time through motor starter contact M3S.

When the package has reached its full size as determined by the setting of the timer (512) T2, the timer contacts T2–2 close, energizing the turret indexing motor 60. The indexing motor 60 rotates the turret 44 through one third of a revolution shifting the relative positions of the motors 53, 55 and 57 in a clockwise direction as viewed in FIGURE 1, moving the completed packages of strand to the position previously occupied by the collet 54 as illustrated in FIGURE 5, moving the collet 56 carrying the empty sleeves into winding position previously occupied by the collet 52, and moving collet 52 into the position previously occupied by collet 54.

As the indexing operation is started, the cam limit switch CLS4 is closed, energizing the relay contacts CR12. The index motor 60 is held in circuit through relay contacts CR12–1. The contacts CR12–2 are closed energizing the control relay CR5 and the delay timer TDR2 which controls direct current brake force applied to motor 53 to reduce the speed of the collet 52 carrying the completed packages. The normally closed relay contacts CR5–1 open, de-energizing the motor starting timer T1 and the timer T2 being the package size control. This action allows both timers to reset.

The timer contacts T1–2 open, de-energizing motor starter control M3S. The timer contacts T2–3 open, de-energizing the reset timer T3. At the instant the reset timer T3 is de-energized, the control relay CR1 is energized through the normally closed contacts of the timer contacts T3–2.

The solenoid valve 435 is de-energized through the normally closed contacts of control relay CR1–1. The solenoid valve 436 in the hydraulic system and the compressed air control solenoid valve 558 (shown in FIGURE 15) are energized through relay contacts CR1–2. This action resets the hydraulic actuators 440, 272 and 422 preparatory to the next automatic winding cycle.

The energization of the air control valve 558 effects movement of the strand hold-off bar 296 in a right-hand direction as viewed in FIGURE 15 to move the strands 22 and 24 to the transfer regions of the sleeves or collectors under the influence of the cam grooves 315 and 316 and the cooperating cam follower or plunger 320 shown in FIGURE 16. The strands are now in a position to effect their transfer onto the empty collector sleeves or tubes 51 carried by the collet 56 now moved into winding position at the winding station.

At the same time that the turret is indexed to bring the collet 56 into winding position, the cam operated limit switch CLS–1 opens, de-energizing the control relay CR9. The relay contacts CR9–1 and CR9–2 open, de-energizing the control M1R to disconnect the circuit to the motor 53 and de-energizing the control M3S which applies reduced voltage to the motor 57 during starting thereof. The cam operated limit switch CLS–2 closes to energize the control relay CR10 through the normally closed relay contacts CR9–4.

The control M3R for applying full voltage to the motor 57 of the spindle 56 in winding position is energized through contacts CR10–1. The motor braking control M1B for the motor 53, now moved away from winding position carrying full packages of strand, is energized through time delay relay contacts TDR2–1 and contacts CR10–3. The brake control M1B supplies direct current braking power to motor 53 as it moves away from winding position.

As the collet 56 carrying the empty sleeves or tubes is moved toward the winding station and is rotating at the speed of the collet 52 bearing the completed packages and, as the collet 52 is rapidly slowing down under the influence of the braking forces provided by the direct current braking power applied to the motor 53, slack regions in the strands occur between the empty sleeves 51 on the collet 56 and the completed packages which have moved away from the winding station.

The slack regions of the strand are adjacent the peripheries of the end regions of the empty sleeves on the collet 56, and allow the strands to adhere or "lick" to the peripheries of the empty sleeves whereby initial winding of the strands on the empty sleeves is begun.

The strands adhering to the empty sleeves and the initial convolutions are snubbed by succeeding convolutions or wraps setting up tension in the regions of the strands between the completed strand packages and the initial strands on the empty sleeves causing the strands to break or fracture between the completed packages and the empty sleeves, thus freeing the completed packages which are being brought to rest by the D.C. current braking forces applied to the motor 53 by the control M1B.

When the indexing operation performed by the indexing motor 60 is completed, the cam limit switch CLS–4 opens de-energizing control relay CR12. The contacts CR12–2 open, de-energizing the time delay relay TDR2 and the control relay CR5. Contacts CR12–1 open, de-energizing the indexing motor 60. The motor starting timer T1 and the package timer T2 are energized through normally closed contacts CR5–1, and the timers T1 and T2 are held energized or sealed in through contacts T1–1 and T2–1.

The contacts T2–3, which are normally timed open, are closed energizing the reset timer T3. Contacts T3–2 open, de-energize control relay CR1. The contacts CR1–2 open, de-energizing the solenoid 436 of valve means 435.

The solenoid 435 of the valve 434 is energized through normally closed contacts CR1–1 at the same time contacts CR1–2 open de-energizing the solenoid of the compressed air control valve 558 for the traverse bar actuator 288.

The strand hold-off bar 296, under the influence of compressed air admitted to the actuator 288, moves into its retracted position, and the strands 22 and 24 move through the reentrant slots 186 and 188 in the high frequency oscillators 104 and 106 into the guide grooves 108 therein to initiate strand traversing operations at the winding station to form two strand packages on the sleeves 51 carried by the collet 56.

Time delay relay contacts TDR2–1 open, de-energizing the brake current control M1B to interrupt the direct current braking force from the motor 53 which is out of winding position and its rotation ceases. The cycle of operations is repeated during the winding of strands upon the sleeves 51 on the spindle 56 now in the winding position and in subsequent winding operations.

In normal operations, the operator now removes the completed packages from the collet or spindle 52 which is at rest and telescopes empty sleeves or tubes onto the collet 52. If the operator has failed to remove the completed packages from the collet 52 and packages completed on the tubes carried by collet 56 and the turret 44 indexed to bring the collet 54 and sleeves carried thereby into winding position, the doff safety switch 340 is brought into operation.

If an unremoved completed package is indexed into position adjacent the safety switch LS–3, contained in switch housing 340, the roller 354 carried by the actuating arm 348 is engaged by the periphery of the strand package, closing the switch LS–3 which initiates the operation of the timer T4.

The timer starts timing through the contacts T4–1, and the contacts T4–3 close, energizing the control relay CR6. The normally closed contacts CR6–1 open, de-energizing the emergency control relay CRES.

The de-energization of the relay CRES disconnects all power from the apparatus and thereby prevents damage by the movement of undoffed strand packages into strand winding position. The timer T4 is timed so that it does not initiate de-energization of the relay CRES until a short time before the completion of strand packages being wound at the winding station. The doff safety circuit is reset by manual operation of the resetting switch 57 illustrated in FIGURE 22.

The controls M2S, M2R, M3S and M3R control the starting and running of the motors 57 and 55 through the associated relays shown in FIGURES 22 and 23 in the same manner that the collet motor 53 is controlled. The controls M2B and M3B, through their associated relays, impress direct current braking forces to the motors 55 and 57 when the collets driven thereby are indexed out of winding position.

It is desirable to deliver fine sprays of moisture or water in the regions of traverse of the oscillators 104 and 106. As shown in FIGURES 1, 2 and 3 a manifold or tube 574 is equipped with nozzles 575 and 576, the nozzles being adjustable to deliver fine sprays of water in the region of traverse of the oscillators. The manifold or pipe 574 is connected with any pressure water supply.

It is desirable that the traverse oscillators 104 and 106 rotate with reference to the winding spindle speed in an odd ratio as for example one to one and seven-sixteenths times the spindle speed, speeds of the oscillators being adjustable by the flow control valve 420 which is cam operated by the hydraulic actuator 422.

The provision of the differential in speed ratio between the traverse oscillators and the winding spindle speed reduces to a minimum the tendency for ridges of strand to form during distribution of the oscillated strand lengthwise of the sleeve or collector during package formation.

Other ratios of oscillator traverse speed to winding spindle speed may be employed, and various modifications of strand ridge formations in the package result from various speed ratios between these components.

It is apparent that, within the scope of the invention, modifications and different arrangements may be made other than as herein disclosed, and the present disclosure is illustrative merely, the invention comprehending all variations thereof.

I claim:

1. The method of continuously collecting linear bodies of filamentary material in wound packages including concomitantly rotating dual collectors, concomitantly winding a linear body of the material on each collector, distributing the linear bodies lengthwise of the collectors, progressively modifying the lengthwise distribution of the bodies as the packages increase in size, oscillating the bodies as they are wound into packages to form overlapping angularly arranged wraps, varying the frequency of oscillation of the bodies during winding of the packages, rotating a second pair of empty collectors to substantially the peripheral speed of the package-bearing collectors, simultaneously diverting the linear bodies away from the oscillators to a transfer region, engaging the linear bodies with the empty collectors, effecting a reduction in the speed of the package-bearing collectors to cause the advancing bodies to adhere to the empty collectors, effecting fracture of the bodies at the transfer region to free the completed packages, and directing the linear bodies into the influence of the oscillators as the bodies are wound on the empty collectors.

2. The method of continuously collecting strands of filamentary material in wound packages including concomitantly rotating dual collectors, concomitantly winding a strand on each collector, concomitantly traversing the strands lengthwise of the collectors, varying the lengthwise distribution of the strands as the packages increase in size, oscillating the strands at comparatively high frequencies as they are wound into packages to form overlapping angularly arranged wraps of strand, rotating a second pair of empty collectors to substantially the peripheral speed of the package-bearing collectors, simultaneously diverting the strands away from the oscillators to a transfer region, engaging the strands with the empty collectors, effecting a reduction in the speed of the package-bearing collectors to cause the advancing strands to adhere to the empty collectors effecting fracture of the strands at the transfer region to free the completed package, and directing the strands into the influence of the oscillators during winding of the strands on the empty collectors.

3. The method of forming and collecting filaments of heat-softenable material in wound packages including the steps of flowing a group of streams of the material from a supply, rotating a collector by a motor at a winding station, winding a strand of continuous filaments formed from the streams on the rotating collector, oscillating the strand at high frequencies to deposit the individual wraps of strand on the collector in crossing relation, traversing the oscillating strand to distribute the strand lengthwise of the collector, rotating the motor by electric energy from a high frequency alternator, progressively reducing the output frequency of the alternator for modulating the speed of the motor rotating the collector whereby to maintain substantially constant the rate of linear travel of the strand as the package of strand increases in size, varying the lengthwise distribution of the strand on the package to form tapered ends on the package, and modulating the rate of frequency of oscillation of the strand as the package increases in size.

4. The method of forming and collecting filaments of heat-softenable material in packages including the steps of flowing two groups of streams of the material from a supply, rotating dual collectors in axially aligned adjacent relation at a winding station, winding strands of filaments formed from the groups of streams onto the collectors, oscillating the strands at high frequencies to deposit the wraps of strands on the collectors in angular crossing relation, traversing the oscillating strands to distribute the strands lengthwise of the collectors, varying the lengthwise distribution of the strands on the packages, and varying the speed of rotation of the collectors and the rate of frequency of oscillations of the strands as the packages increase in size.

5. The method of forming and collecting filaments of heat-softenable material in packages including the steps of flowing two groups of streams of the material from a supply, rotating dual collectors at a winding station, winding two strands of continuous filaments formed from the groups of streams onto the collectors respectively, oscillating the strands at high frequencies to deposit the wraps of strands on the collectors in angular relation, traversing the oscillating strands to distribute the strands lengthwise of the collectors, progressively varying the lengthwise distribution of the strands on the packages, reducing the speed of rotation of the collectors and modulating the rate of frequency of oscillation of the strands as the packages increase in size, moving the strands to a transfer region at the completion of the packages and interrupting oscillation of the strands, rotating a pair of empty collectors, indexing the completed packages away from the winding station and the pair of empty collectors into the winding station, rapidly reducing the speed of the completed packages to effect transfer of the strands to the empty collectors and fracture the strands adjacent the completed packages, and re-initiating oscillation of the strands and movement of the strands lengthwise of the empty collectors to form packages of strand on the empty collectors.

6. The method of forming and collecting filaments of heat-softenable material in packages including the steps of flowing two groups of streams of the material from a supply, rotating dual collectors at a winding station, winding two strands of continuous filaments formed from the groups of streams onto the collectors respectively, oscillating the strands at high frequencies to deposit the wraps of strands on the collectors in angular relation, traversing the oscillating strands to distribute the strands lengthwise of the collectors, progressively reducing the lengthwise distribution of the strands to form tapered ends on the packages, progressively reducing the speed of rotation of the collectors and the rate of frequency of oscillation of the strands as the packages increase in size, moving the strands to a transfer region at the completion of the packages while ceasing oscillation of the strands, rotating a pair of empty collectors, indexing the completed packages away from the winding station and the pair of rotating empty collectors into the winding station, rapidly reducing the speed of the completed packages to effect transfer of the strands to the empty collectors and fracture the strands adjacent the completed packages, and re-initiating oscillation of the strands and movement of the strands lengthwise of the empty collectors to form packages of strand on the empty collectors.

7. The method of forming and collecting continuous filaments of glass in packages including the steps of flowing two groups of streams of glass from a supply, rotating dual collectors in axially aligned adjacent relation at a winding station, winding two strands of filaments formed from the groups of streams onto the collectors respectively, oscillating the strands at high frequencies to deposit the individual wraps of strands on the collectors in angular crossing relation, traversing the oscillating strands to distribute the strands lengthwise of the collectors, spraying a liquid onto the strands at the region of oscillation and collection of the strands, progressively reducing the lengthwise traverse of the strands to form tapered ends on the packages, and progressively reducing the speed of rotation of the collectors and modulating the rate of frequency of oscillations of the strands as the packages increase in size.

8. Apparatus of the character disclosed, in combination, a frame, an indexible head journaled on the frame, a plurality of winding collets mounted by said head, driving means individual to each collet for rotating the same, a collector adapted to be mounted on each of said collets upon which a linear bundle of filaments is wound to form a package, means for distributing the linear bundle on the collector including a reciprocable carrier, an oscillator mounted by the carrier arranged to be engaged by the linear bundle, means for actuating the traverse oscillator to effect high frequency oscillation of the bundle of filaments and collection of the linear bundle in overlapping individual wraps, means for reciprocating the carrier to distribute the overlapping wraps lengthwise on the collector, means effective to progressively reduce the successive reciprocatory movements of the oscillator carrier to effect the formation of tapered ends in the package, means effective to modulate the speed of rotation of the traverse oscillator, and timing means for establishing the duration of a winding operation to regulate the size of the package and initiate indexing movement of the head to move an empty collector into winding position.

9. Apparatus of the character disclosed, in combination, a frame, an indexible head journaled on the frame, a plurality of winding collets mounted by said head, driving means individual to each collet for rotating the same, a collector adapted to be mounted on each of said collets upon which a linear bundle of filaments is wound to form a package, means for distributing the linear bundle on the collector including a reciprocable carrier, a rotatable traverse oscillator mounted by the carrier, arranged to be engaged by the linear bundle, hydraulic means for rotating the traverse oscillator to effect collection of the linear bundle in overlapping wraps, means for modulating the speed of the oscillator, and means for reciprocating the carrier to distribute the overlapping wraps lengthwise on the collector.

10. Apparatus of the character disclosed, in combination, a frame, an indexible head journaled on the frame, a plurality of winding collets mounted by said head, driving means individual to each collet for rotating the same, a collector adapted to be mounted on each of said collets upon which a linear bundle of filaments is wound to form a package, means for distributing the linear bundle on the collector including a reciprocable carrier, a high frequency traverse oscillator mounted by the carrier arranged to be engaged by the linear bundle, means for actuating the traverse oscillator to effect collections of the linear bundle in overlapping wraps, means for modulating the frequency of the oscillator as the package increases in size, hydraulic means for reciprocating the carrier to distribute the overlapping wraps lengthwise on the collector, hydraulic metering means effective to progressively reduce the successive reciprocatory movements of the traverse carrier to effect the formation of tapered ends in the package, and timing means for establishing the duration of a winding operation to regulate the size of the package.

11. Apparatus of the character disclosed, in combination, a frame, an indexible head journaled on the frame, a plurality of winding collets mounted by said head, driving means individual to each collet for rotating the same, a collector adapted to be mounted on each of said collets upon which a linear bundle of filaments is wound to form a package, means for distributing the linear bundle on the collector including a reciprocable carrier, a rotatable traverse oscillator mounted by the carrier arranged to be engaged by the linear bundle, hydraulic means for rotating the traverse oscillator to effect oscillation and collection of the linear bundle in overlapping wraps, hydraulic means for reciprocating the carrier to distribute the overlapping wraps lengthwise on the collector, hydraulic metering means effective to progressively reduce the successive reciprocatory movements of the traverse carrier to effect the formation of tapered ends in the package, metering means effective to regulate the speed of rotation of the traverse oscillator, and timing means for establishing the duration of a winding operation to regulate the size of the package.

12. Apparatus of the character disclosed in combination, a winding collet, a first electrically energizable motor arranged to rotate the collet, a collector adapted to be mounted on said collet upon which a linear bundle of filaments is wound to form a package, primary and secondary traverse means for distributing the bundle of filaments on the collector, a high frequency alternator arranged to supply current to the first motor, a second electrically energizable motor adapted to rotate at a substantially constant speed, a variable speed coupling for transmitting torque from the second motor to the alternator, means providing a variable reference voltage for controlling the speed of the coupling, means for varying the reference voltage for controlling the coupling, means for varying the output voltage of the alternator, the means for varying the reference voltage controlling the coupling and the means for varying the output voltage being arranged to correlate the speed and output voltage of the alternator to modulate the speed of the first motor as the package of filaments increases in size to maintain substantially constant the rate of linear travel of the bundle of filaments.

13. Apparatus of the character disclosed in combination, a winding collet, a first electrically energizable motor arranged to rotate the collet, a collector adapted to be mounted on said collet upon which a linear bundle of filaments is wound to form a package, primary and secondary traverse means for distributing the bundle of filaments on the collector, a high frequency alternator arranged to supply current to the first motor, a second electrically energizable motor adapted to rotate at a substantially constant speed, a variable speed coupling for transmitting torque from the second motor to the alternator, means providing a variable reference voltage for controlling the speed of the coupling, hydraulically actuated means for changing the reference voltage for controlling the coupling and for changing the output voltage of the alternator, and adjustable metering means arranged to control the hydraulically actuated means to correlate the speed and output voltage of the alternator to vary the speed of the first motor as the package of filaments increases in size to maintain substantially constant the rate of linear travel of the bundle of filaments.

14. Apparatus of the character disclosed in combination, a winding collet, a first electrically energizable motor arranged to rotate the collet, a collector adapted to be mounted on said collet upon which a linear bundle of filaments is wound to form a package, primary and secondary traverse means for distributing the bundle of filaments on the collector, a high frequency alternator supplying current to the first motor, a second electrically energizable motor adapted to rotate at a substantially constant speed, a variable speed coupling for transmitting torque from the second motor to the alternator, means providing a variable reference voltage for controlling the coupling, means for controlling the output voltage of the alternator, and means for controlling the reference voltage and varying the output voltage control to correlate the speed and output voltage of the alternator to modulate the speed of the first motor as the package of filaments increases in size to maintain substantially constant the rate of linear travel of the bundle of filaments.

15. Apparatus for winding linear material into packages including, in combination, a support, an indexible turret journaled on the support, a plurality of winding collets journaled on the turret, a pair of collector tubes adapted to be mounted on each of said collets upon which the linear material is to be wound, electrically energizable motors individual to each collet for rotating the same, a reciprocable carrier mounted on the support, a pair of high frequency oscillators mounted by the carrier and engageable with the strands, a strand hold-off bar for effecting transfer of the strands from completed packages onto empty collector tubes, and means for effecting rotary and reciprocatory movements of said strand hold-off bar.

16. Apparatus for winding strands of linear material into packages including, in combination, a support, an indexible turret journaled on the support, a plurality of winding collets journaled on the turret, a pair of collector tubes adapted to be mounted on each of said collets upon which strands of linear material are to be wound, electrically energizable motors individual to each collet for rotating the same, a reciprocable carrier mounted on the support, a pair of high frequency oscillators mounted by the carrier and engageable with the strands to oscillate the strands, a strand hold-off bar for effecting transfer of the strands from completed packages onto empty collector tubes, means for effecting rotary and reciprocatory movement to said strand hold-off bar, an alternator arranged to generate high frequency current for said collet driving motors, means arranged to vary the speed of the alternator and the output voltage of the alternator for varying the speed of the collet driving motors, means for actuating the oscillators, and means for controlling the oscillator actuating means to modulate the frequency of the oscillators as the packages of strand increase in size.

17. Apparatus for winding linear material into packages including, in combination, a support, an indexible turret journaled on the support, a plurality of winding collets journaled on the turret, driving means individual to each collet for rotating the collets, a pair of collector tubes adapted to be mounted on each of said collets upon which the linear material is to be wound, electrically energizable motors individual to each collet for rotating the same, a reciprocable carrier mounted on the support, a pair of high frequency rotatable oscillators mounted by the carrier and engageable with the strands, said oscillators being in dynamic balance, a strand hold-off bar for effecting transfer of the strands from completed packages onto empty collector tubes, means for effecting rotary and reciprocatory movement to said strand hold-off bar, an alternator arranged to generate high frequency current for said collet driving motors, means arranged to vary the speed of the alternator and the output voltage of the alternator for varying the speed of the collet driving motors, a hydraulic motor for rotating the oscillators, a hydraulic actuator, a variable metering valve for regulating delivery of liquid to the oscillator driving motor, and means controlled by said hydraulic actuator for adjusting the variable metering valve for the oscillator driving motor to modulate the speed of rotation of the oscillators as the packages of strand increase in size.

18. Apparatus for winding linear material into packages including, in combination, a support, an indexible turret journaled on the support, a plurality of winding collets journaled on the turret, driving means individual to each collet for rotating the collets, a pair of collector tubes adapted to be mounted on each of said collets upon which the linear material is to be wound, electrically energized motors individual to each collet for rotating the same, a reciprocable carrier mounted on the support, a pair of high frequency rotatable oscillators mounted by the carrier and engageable with the strands, said oscillators being in dynamic balance, a strand hold-off bar for effecting transfer of the strands from completed packages onto empty collector tubes, means for effecting rotary and reciprocatory movement to said strand hold-off bar, an alternator arranged to generate high frequency current for said collet driving motors, means arranged to vary the speed of the alternator and the output voltage of the alternator for varying the speed of the collet driving motors, a hydraulic motor for driving the oscillators, a first hydraulic actuator, a variable metering valve for regulating delivery of liquid to the oscillator driving motor, means controlled by said first hydraulic actuator for adjusting the variable metering valve for the oscillator driving motor, a second hydraulic actuator for controlling the voltage varying means for the alternator, a third hydraulic actuator for reciprocating the oscillator carrier, solenoid controlled valve means for controlling the direction of reciprocation of the oscillator carrier, and hydraulically controlled means for effecting variable reciprocation of the third actuator to progressively reduce the distribution of the strands lengthwise of the packages to form tapered ends on the packages.

19. Apparatus for winding linear material into packages including, in combination, a support, an indexible turret journaled on the support, a plurality of winding collets journaled on the turret, driving means individual to each collet for rotating the collets, a pair of collector tubes adapted to be mounted on each of said collets upon which the linear material is to be wound, electrically energized motors individual to each collet for rotating same, a reciprocable carrier mounted on the support, a pair of high frequency rotatable oscillators mounted by the carrier and engageable with the strands, said oscillators being in dynamic balance, a strand hold-off bar for effecting transfer of the strands from the completed packages onto empty collector tubes, cam means for effecting rotary and reciprocatory movement to said strand hold-off bar, an alternator arranged to generate high frequency current for said collet driving motors, means arranged to vary the speed of the alternator and the output voltage of the alternator for varying the speed of the collet driving motors, a hydraulic motor for driving the oscillators, a first hydraulic actuator, a variable metering valve for regulating delivery of liquid to the oscillator driving motor, means controlled by said first hydraulic actuator for adjusting the variable metering valve for the oscillator driving motor, a second hydraulic actuator for controlling the voltage varying means for the alternator, a third hydraulic actuator for reciprocating the oscillator carrier, a first solenoid controlled valve means for controlling the direction of reciprocation of the oscillator carrier, hydraulically controlled means for effecting variable reciprocation of the third actuator to progressively reduce the distribution of the strands lengthwise of the packages to form tapered ends on the packages, a second solenoid actuated valve means for controlling direction of flow of liquid under pressure to said hydraulic actuators, and timer means controlling said second solenoid actuated valve means for resetting the actuators upon completion of the packages.

20. Apparatus for winding linear material into packages including, in combination, support means, a winding collet journally mounted by the support means, a motor arranged to rotate the collet, a collector tube adapted to be mounted on the collet upon which the linear material is to be wound, a reciprocable carrier mounted by the support means, a rotatable oscillator mounted by the carrier and engageable with the strand for traversing the strand during winding of the strand on a collector tube, means mounted by the carrier for rotating the oscillator, a strand hold-off means for effecting transfer of the strand from package winding position to a transfer region at the completion of a package, and means for effecting relative rotary and reciprocable movements of the strand hold-off means.

References Cited in the file of this patent

UNITED STATES PATENTS

| | | |
|---|---|---|
| 2,147,664 | Moncrieff et al. | Feb. 21, 1939 |
| 2,234,986 | Slayter et al. | Mar. 18, 1941 |
| 2,379,813 | Loveridge et al. | July 3, 1945 |
| 2,419,462 | Petch et al. | Apr. 22, 1947 |
| 2,527,502 | Simison et al. | Oct. 24, 1950 |
| 2,623,240 | McDermott | Dec. 30, 1952 |
| 2,682,618 | Jaeschke | June 29, 1954 |
| 2,763,824 | Bacheler | Sept. 18, 1956 |
| 2,772,054 | Herele et al. | Nov. 27, 1956 |
| 2,905,403 | Pim et al. | Sept. 22, 1959 |
| 2,970,788 | Warncke | Feb. 7, 1961 |

FOREIGN PATENTS

| | | |
|---|---|---|
| 466,978 | France | Mar. 20, 1914 |
| 650,228 | Germany | Sept. 16, 1937 |